(12) United States Patent
Hoglund et al.

(10) Patent No.: US 11,696,263 B2
(45) Date of Patent: Jul. 4, 2023

(54) SIB1-NB TRANSMISSIONS FOR NB TDD COMMUNICATION

(71) Applicant: Telefonaktiebolaget LM Ericsson (publ), Stockholm (SE)

(72) Inventors: Andreas Hoglund, Solna (SE); Yuhang Liu, Lund (SE); Gerardo Agni Medina Acosta, Marsta (SE); Ritesh Shreevastav, Upplands Vasby (SE); Yutao Sui, Solna (SE)

(73) Assignee: TELEFONAKTIEBOLAGET LM ERICSSON (publ), Stockholm (SE)

(*) Notice: Subject to any disclaimer, the term of this patent is extended or adjusted under 35 U.S.C. 154(b) by 109 days.

(21) Appl. No.: 16/963,178

(22) PCT Filed: Jan. 25, 2019

(86) PCT No.: PCT/EP2019/051885
§ 371 (c)(1),
(2) Date: Jul. 17, 2020

(87) PCT Pub. No.: WO2019/145494
PCT Pub. Date: Jan. 8, 2019

(65) Prior Publication Data
US 2021/0127375 A1    Apr. 29, 2021

Related U.S. Application Data

(60) Provisional application No. 62/621,882, filed on Jan. 25, 2018.

(51) Int. Cl.
*H04W 72/044* (2023.01)
*H04B 7/26* (2006.01)
(Continued)

(52) U.S. Cl.
CPC .......... *H04W 72/044* (2013.01); *H04B 7/265* (2013.01); *H04L 5/0053* (2013.01); *H04W 48/08* (2013.01)

(58) Field of Classification Search
CPC ............. H04L 5/14; H04W 4/70; H04B 7/265
See application file for complete search history.

(56) References Cited

U.S. PATENT DOCUMENTS

2015/0109971 A1    4/2015  Wei
2017/0251443 A1*   8/2017  Shin ..................... H04L 5/0098
(Continued)

OTHER PUBLICATIONS

PCT International Search Report, dated May 24, 2019, in connection with International Application No. PCT/EP2019/051885, all pages.
(Continued)

*Primary Examiner* — Ayaz R Sheikh
*Assistant Examiner* — Debebe A Asefa
(74) *Attorney, Agent, or Firm* — Leffler Intellectual Property Law, PLLC

(57) ABSTRACT

Apparatuses and methods are disclosed for SIB1-NB transmission. In one embodiment, a method performed by a network node configured to include a scheduling information parameter in a master information block, MIB, and communicate the MIB to a wireless device, the scheduling information parameter usable to schedule a system information block type 1 for narrow band communication, SIB1-NB, for a time division duplex, TDD transmission is provided. The method comprising indicating the SIB1-NB scheduling information for TDD at least in part by a value of the scheduling information parameter being associated with a predefined entry in at least one TDD-specific table, the indicated SIB1-NB scheduling information including: at least one subframe to use for the SIB1-NB transmission; a
(Continued)

number of repetitions of the SIB1-NB transmission; and a transport block size, TBS, to use for the SIB1-NB transmission.

18 Claims, 12 Drawing Sheets

(51) Int. Cl.
*H04L 5/00* (2006.01)
*H04W 48/08* (2009.01)

(56) References Cited

U.S. PATENT DOCUMENTS

| | | | |
|---|---|---|---|
| 2017/0251455 A1* | 8/2017 | Shin | H04L 67/12 |
| 2019/0150155 A1* | 5/2019 | Chatterjee | H04L 1/004 370/335 |
| 2019/0253231 A1* | 8/2019 | Park | H04L 5/1469 |
| 2021/0099944 A1* | 4/2021 | Hoglund | H04L 5/0005 |

OTHER PUBLICATIONS

PCT Written Opinion, dated May 24, 2019, in connection with International Application No. PCT/EP2019/051885, all pages.
3GPP TSG RAN WG2 Meeting #100, R2-1713195, Reno, USA, Nov. 27-Dec. 1, 2017, "System Information scheduling in TDD mode", Huawei, HiSilicon, Neul, 7 pages.
3GPP TSG RAN WG1 Meeting #91, R1-1719740, Reno, USA, Nov. 27-Dec. 1, 2017, "Views on TDD downlink aspect", Lenovo, Motorola Mobility, 5 pages.
3GPP TSG RAN WG1 Meeting #91, R1-1720138, Reno, USA, Nov. 27-Dec. 1, 2017, "Downlink aspects of TDD support in NB-IoT", Nokia, Nokia Shanghai Bell, 7 pages.
3GPP TSG RAN WG2 #100, R2-1713360, Reno, USA, Nov. 27-Dec. 2, 2017, "MIB,SIBs and Paging for NB-IoT TDD", Ericsson, 8 pages.
3GPP TSG RAN WG1 Meeting #91, R1-1720049, Reno, USA, Nov. 27-Dec. 1, 2017, "Design of DL aspects for TDD support in feNB-IoT", Intel Corporation, 5 pages.
3GPP TSG RAN WG1 Nb-Iot AdHoc, R1-160080, Budapest, Hungary, Jan. 18-22, 2016, "NB-IoT—Synchronization Channel Evaluations", Ericsson, 6 pages.
3GPP TSG RAN Meeting #76, RP-171428, West Palm Beach, USA, Jun. 5-8, 2017, "Revised WID on Further NB IoT enhancements", Huawei, HiSilicon, 5 pages.
3GPP TSG RAN WG1 NB-IoT Ad-Hoc Meeting, R1-160022, Budapest, Hungary, Jan. 18-20, 2016, "Channel raster design", Huawei, HiSilicon, 5 pages.
3GPP TSG RAN1 NB-IoT Ad Hoc, R1-160082, Jan. 18-20, 2016, Budapest, Hungary, "NB-IoT Channel Raster", Ericsson, 3 pages.
3GPP TSG-RAN WG1 Meeting #84, R1-161548, St. Julian's, Malta, Feb. 15-19, 2016, "RAN1 agreements for Rel 13 NB IoT", WI rapporteur (Ericsson), 11 pages.
3GPP TSG RAN WG1 Meeting #90bis, R1-1719127, Prague, Czech Republic, Oct. 9-13, 2017, "Chairman's Notes of AI 6.2.6 Further enhancements of NB IoT", Ad-Hoc chair (Huawei), 7 pages.
3GPP TSG RAN WG1 Meeting #91, R1-1719477, Reno, USA, Nov. 27-Dec. 2, 2017, "On downlink TDD NB IoT", Huawei, HiSilicon, 5 pages.
3GPP TSG RAN WG4 Meeting #82bis, R4-1703804, Spokane, Washington, USA, Apr. 3-7, 2017, "Channel Raster For Multiple Standalone NB-IoT Carriers", Nokia, Alcatel-Lucent Shanghai Bell, 5 pages.
3GPP TSG RAN Meeting #70, RP-152284, Sitges, Spain, Dec. 7-10, 2015, "Revised Work Item: Narrowband IoT (NB IoT)", Huawei, HiSilicon, 9 pages.
3GPP TSG RAN WG1 NB-IoT Ad-Hoc Meeting, R1-160021, Budapest, Hungary, Jan. 18-20, 2016, "Synchronization signal evaluation", Huawei, HiSilicon, 7 pages.
3GPP TS 36.331 V14.4.0 (Sep. 2017), 3rd Generation Partnership Project; Technical Specification Group Radio Access Network; Evolved Universal Terrestrial Radio Access (E-UTRA); Radio Resource Control (RRC); Protocol specification (Release 14), 753 pages (Sep. 2017).
India Examination Report dated Nov. 12, 2021 in connection with India Application No. 202017032275, 6 pages.

\* cited by examiner

FIG. 2

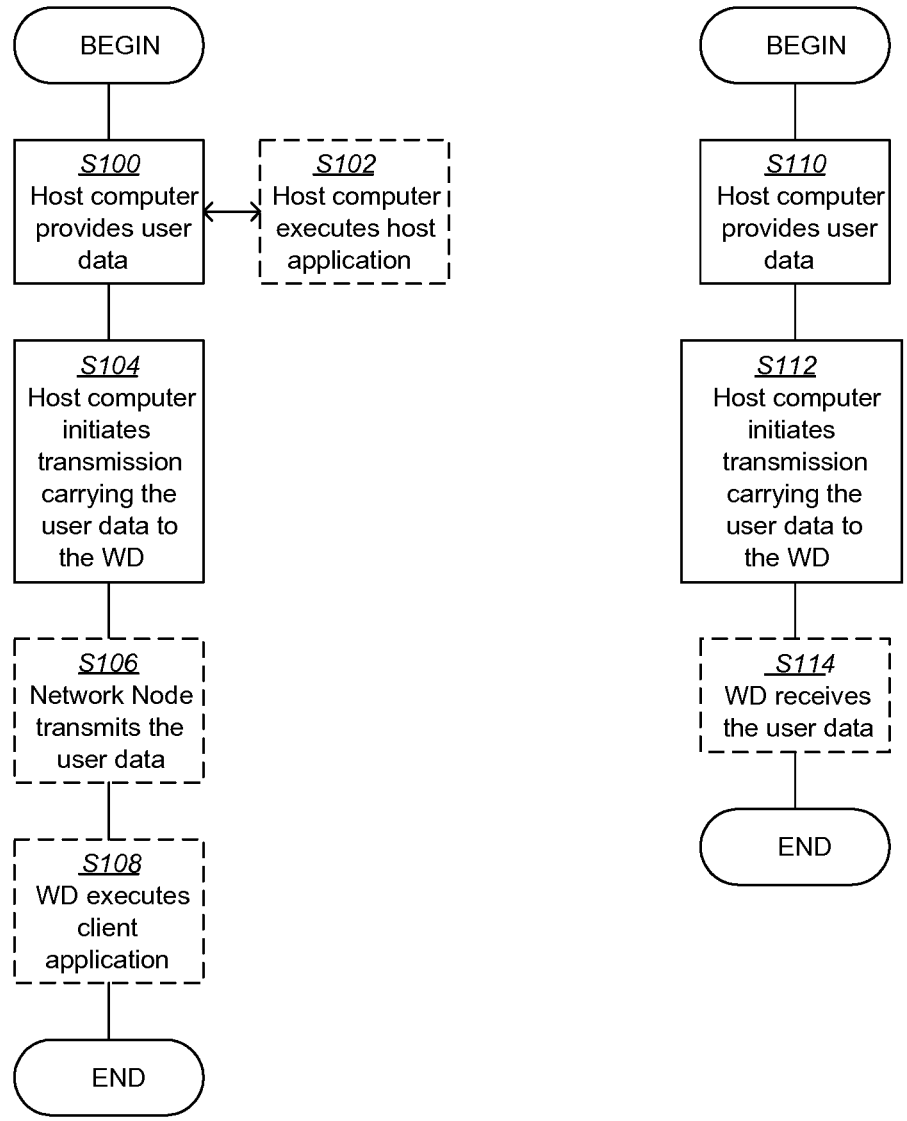

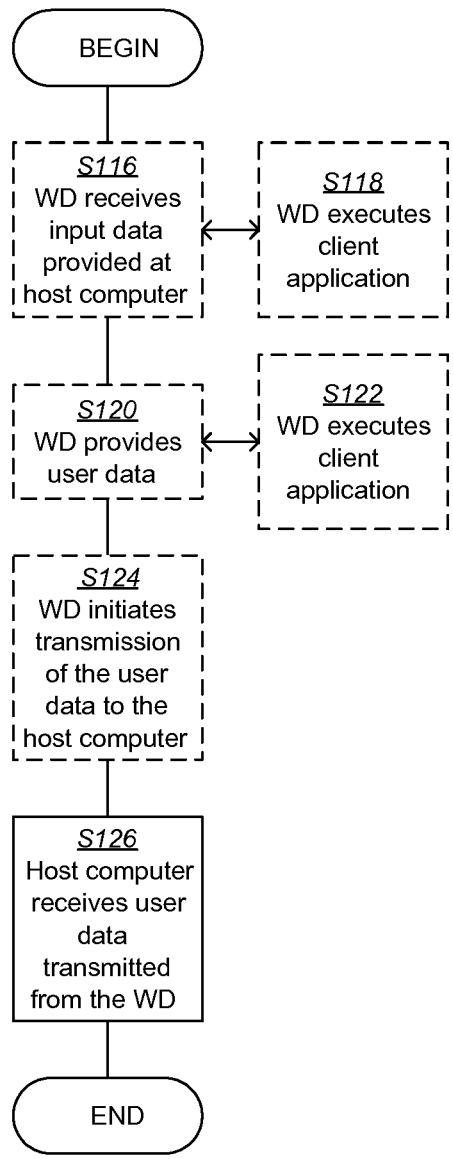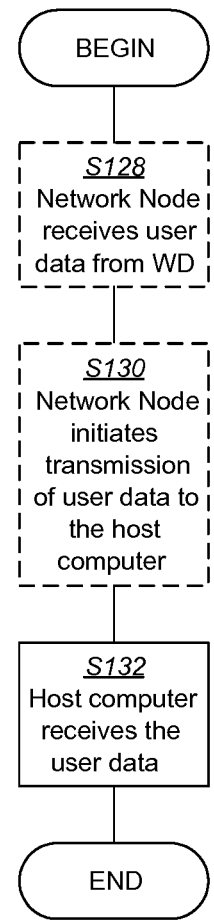
FIG. 12
FIG. 13

| Index from the middle | 10 MHz RBG (3 PRBs) | Index from low freq to high freq, 10MHz (50 PRB) | 20MHz RBG (4PRBs) | Index from low freq to high freq, 20MHz (100 PRB) |
|---|---|---|---|---|
| 16 | RGB13 | 41 | | 66 |
| 15 | | 40 | | 65 |
| 14 | | 39 | | 64 |
| 13 | RGB12 | 38 | RGB15 | 63 |
| 12 | | 37 | | 62 |
| 11 | | 36 | | 61 |
| 10 | RGB11 | 35 | | 60 |
| 9 | | 34 | RGB14 | 59 |
| 8 | | 33 | | 58 |
| 7 | RGB10 | 32 | | 57 |
| 6 | | 31 | | 56 |
| 5 | | 30 | RGB13 | 55 |
| 4 | RGB9 | 29 | | 54 |
| 3 | | 28 | | 53 |
| 2 | | 27 | | 52 |
| 1 | RGB8 | 26 | RGB12 | 51 |
| 0 | | 25 | | 50 |

FIG. 16

SIB1-NB TRANSMISSIONS FOR NB TDD COMMUNICATION

TECHNICAL FIELD

Wireless communication and in particular, to methods and apparatuses for indicating a subcarrier mapping and/or number of repetitions of System Information Block Type 1-Narrow Band (SIB1-NB) Transmissions for time division duplex (TDD) operation.

BACKGROUND

NB-IoT is a narrowband system being developed for cellular Internet of Things (IoT) by 3GPP. The system provides access to network services using the physical layer optimized for very low power consumption (e.g., full carrier bandwidth is 180 kHz, subcarrier spacing can be 3.75 kHz or 15 kHz). The system is based on existing Long-Term Evolution (LTE) systems and addresses optimized network architecture and improved indoor coverage for massive numbers of devices with the following characteristics:
- low throughput devices (e.g., 2 kbps);
- low delay sensitivity (e.g., ~10 seconds);
- ultra-low device cost (e.g., below 5 U.S. dollars); and/or
- low device power consumption (e.g., battery life of 10 years).

Each cell (e.g., ~1 km2) in this system may serve thousands (e.g., ~50 thousand) devices such as sensors, meters, actuators, and the like. To be able to make use of the existing spectrum for, e.g., Global System for Mobile Communication (GSM), a fairly narrow bandwidth has been adopted for NB-IoT technology.

Three different operation modes are defined, i.e., stand-alone, guard-band, and in-band. In stand-alone mode, the NB-IoT system can be operated in dedicated frequency bands. For in-band operation, the NB-IoT system can be placed inside the frequency bands used by the current LTE system. In the guard-band mode, the NB-IoT system can be placed in the guard band used by the current LTE system. FIG. 1 shows an exemplary illustration of the three NB-IoT operation modes. The NB-IoT can operate with a system bandwidth of 180 kHz. When multi-carriers are configured, several 180 kHz Physical Resource Blocks (PRBs) can be used, e.g., for increasing the system capacity, inter-cell interference coordination, load balancing, etc.

The channel raster of the downlink of NB-IoT systems is on a frequency grid of 100 kHz. That is, the NB-IoT devices try to search for the NB-IoT carriers in a step size of 100 kHz. For the stand-alone operation, this may be acceptable. However, for the in-band and guard-band operation, due to the presence of the Direct Current-carrier (DC-carrier) and the fact that the center of the PRB is in between two sub-carriers, there is no PRB that falls directly on the cell search grid used in the LTE in-band operation. The frequency offset to the 100 kHz grid is a minimum of ±2.5 kHz and ±7.5 kHz for even and odd number of PRBs in the LTE system bandwidth, respectively. This is shown in FIG. 2. The ±2.5 kHz or ±7.5 kHz can be handled by the device during the cell search process and then be compensated. However, these offsets constrain the positions where NB-IoT carriers can be deployed for the in-band and guard-band operations. Therefore, for a NB-IoT downlink carrier that contains synchronization signal(s) and system information, such carrier can only be put on a frequency that is near the 100 kHz grid point.

Similar to existing LTE wireless devices (e.g., user equipments (UEs)), an NB-IoT wireless device is only required to search for a carrier on a 100 kHz raster. An NB-IoT carrier that is intended for facilitating wireless device initial synchronization is referred to as an anchor carrier. The 100 kHz wireless device search raster implies that for in-band operation, an anchor carrier can only be placed in certain PRBs. Similar to the in-band operation, an NB-IoT anchor carrier in the guard-band operation may have a center frequency of no more than 7.5 kHz from the 100 kHz raster. Generally, NB-IoT cell search and initial acquisition are designed for a wireless device to be able to synchronize to the network in the presence of a raster offset up to ±7.5 kHz.

As mentioned previously, multi-carrier operation of NB-IoT is supported. Since it suffices to have one NB-IoT anchor carrier for facilitating wireless device initial synchronization, the additional carriers do not have to be near the 100 kHz raster grid. The frequency configuration of the additional carriers is either broadcasted in the System Information Blocks (SIBs) or uni-casted using dedicated configuration signaling. These additional carriers are referred to as secondary or non-anchor carriers.

For NB-IoT, currently only frequency-division duplex (FDD) is supported, i.e., the downlink and uplink carriers are on different frequencies. It has been considered that the support of time division duplex (TDD) may be part of further NB-IoT enhancements (feNB-IoT) as follows, for example.

Support for TDD

Specify TDD support for in-band, guard-band, and stand-alone operation modes of NB-IoT. The design may assume no Uplink (UL) compensation gaps are needed by the wireless device, and may strive towards a common design among the operation modes:
- Relaxations of Maximum Coupling Loss (MCL) and/or latency and/or capacity targets to be considered by 3GPP Radio Access Network, working group 1, RAN1.
- Baseline may be to support the same features as Rel-13 NB-IoT, additionally considering small-cells scenarios.

In LTE-TDD, in order to support flexible downlink and uplink partitioning, several configurations are supported, as shown in FIG. 3. Each of the configurations has a different number of uplink and downlink subframes. To co-exist with LTE-TDD in the inband and guard-band operation modes, NB-IoT TDD may be configured with the same uplink-downlink configuration as the one being used by LTE-TDD. Currently, it has been considered that LTE-TDD UL-DL configuration #0 may not be supported in NB-IoT TDD, and whether to reduce the supported configurations even further is being discussed. Therefore, it may be assumed that all of the LTE-TDD configurations, except LTE-TDD UL-DL configuration #0, may be supported by NB-IoT in the future in order that the NB-IoT in-band and guard-band operations are compatible with the legacy LTE-TDD configurations.

As with many cellular networks, such as, for example, GSM, Wideband Code Division Multiple Access (WCDMA) and LTE, in order to access to a NB-IoT network, a wireless device will first start a cell search procedure. Wireless device may perform the Narrowband Primary Synchronization Signal (NPSS) and Narrowband Secondary Synchronization Signal (NSSS) detection to achieve frequency and time synchronization with the network. This is typically performed on an anchor carrier. It has been proposed that whether the NB-IoT system operates in FDD or TDD mode may be implicitly indicated by the relative time position of NSSS with respect to NPSS.

After the frequency and time synchronization is achieved and the FDD/TDD mode is known, the wireless device may then proceed to receive the Physical Broadcast Channel (PBCH) on the anchor carrier to acquire the Master Information Block-Narrowband (MIB-NB), which contains the preliminary cell information and scheduling information for SIB1-NB transmissions. After MIB-NB is acquired, the wireless device may continue to receive SIB1-NB according to the scheduling. SIB1-NB in-turn indicates the scheduling information for receiving the other System Information Blocks (SIBs). After all the relevant system information has been acquired, the wireless device may be able to start to access the network service according to the other procedures defined in the standards, such as, for example, 3GPP specifications for NB-IoT.

In a NB-IoT TDD system, downlink (i.e., transmissions from base-stations to wireless devices in, for example, 3GPP cellular networks) and uplink (i.e., transmissions from wireless devices to base-stations in, for example, 3GPP cellular networks) share the same carrier frequency in a time-division manner. As in the FDD system, NPSS and NSSS signals are transmitted on an anchor carrier. It has also been decided that the Narrowband Physical Broadcast Channel (NPBCH), which broadcasts MIB-NB to the entire cell coverage area, is transmitted on the anchor carrier.

In a NB-IoT TDD system, due to time-sharing of the same carrier frequency between the downlink and the uplink as well as the transmission of NPSS, NSSS and NPBCH channels, there are very few downlink subframes left on the anchor carrier for the other system information broadcasting, paging and downlink user traffic. The partitioning (i.e., number) of downlink and uplink subframes in a LTE TDD network may by defined by the TDD configuration, such as, for example, an exemplary TDD configuration depicted in FIG. 4.

For some uplink-centric LTE TDD configurations, such as configuration 6, there are almost no downlink subframes left for anything else after scheduling of NPSS, NSSS and NPBCH transmission. For this reason, SIB1-NB, as well as the other SIBS, might need to be transmitted in a non-anchor carrier.

Currently, regarding the SIB1-NB transmission in NB-IoT TDD, some proposals have been as follows.

It has been proposed that:
SIB1-NB is transmitted only on the anchor carrier;
    In at least subframe #0 in odd frames
SIB1-NB can be transmitted on non-anchor carrier, details are for further study (FFS);
    It is necessary to consider System Frame Number (SFN) wraparound as part of FFS
The periodicity of SIB1-NB in TDD is the same as FDD (i.e., 2560 ms); and
One transport block of SIB1-NB is transmitted over 8 SIB1-NB subframes (i.e., same as FDD).
It has also been proposed that:
It is not supported that SIB1-NB is transmitted on both anchor and non-anchor carrier;
At least for 16 repetitions for SIB1-NB transmission,
    Whether SIB1-NB transmitted on the anchor carrier or non-anchor one is indicated by MIB-NB,
    When SIB1-NB is transmitted on the non-anchor carrier, at least subframe #0 is used;
    FFS: SIB1-NB can be transmitted on anchor carrier other than subframe #0;
    FFS: The frequency position of the non-anchor carrier is indicated by [0, 1, or 2] bits in the MIB-NB for in-band scenario,
    FFS: The case for guard-band and stand-alone scenarios; and
    FFS: Cases for 4 and 8 repetitions.

As can be seen from the proposals, SIB1-NB can be transmitted on non-anchor carriers. It has been considered that only SF #0 on the anchor should be used for SIB1-NB transmission, and on non-anchor carrier, only 16 repetitions should be used, and the possible candidate subframes on the non-anchor carrier for SIB1-NB transmission is SF #0 and SF #5. However, the concern with such approach is the signaling overhead and possible collisions if Multi-broadcast Single-Frequency Network (MBFSN) is used in a cell.

SUMMARY

Some embodiments advantageously provide a method and system for indicating the scheduling information for SIB1-NB transmissions for NB-IoT TDD. Some embodiments provide for using a minimum number of bits in MIB-NB to signal the scheduling information of SIB1-NB, and/or to maximize the flexibility of scheduling SIB1-NB transmission for NB-IoT TDD.

Some embodiments may advantageously enable the network to have improved flexibility to configure the resource that can be used for SIB1-NB transmission without (significantly) increasing the signaling overhead in MIB-NB.

Some embodiments of the present disclosure may advantageously provide a method and apparatus for indicating at least one SIB1-NB non-anchor carrier for a NB-IoT TDD system, with the few extra bits in the MIB-NB. By implementing some of the embodiments in the NB-IoT TDD system according to the disclosure provided herein, the network may have reasonable flexibility to transmit SIB1-NB on anchor and/or non-anchor carriers for all three operation modes at a reasonably low cost.

According to a first aspect of the present disclosure, a network node configured to include a scheduling information parameter in a master information block, MIB, and communicate the MIB to a wireless device, the scheduling information parameter usable to schedule a system information block type 1 for narrow band communication, SIB1-NB, for a time division duplex, TDD transmission, the network node comprising processing circuitry configured to: indicate the SIB1-NB scheduling information for TDD at least in part by a value of the scheduling information parameter being associated with a predefined entry in at least one TDD-specific table. The indicated SIB1-NB scheduling information includes at least one subframe to use for the SIB1-NB transmission; a number of repetitions of the SIB1-NB transmission; and a transport block size, TBS, to use for the SIB1-NB transmission.

In some embodiments of this aspect, the at least one subframe to use for the SIB1-NB transmission is indicated at least in part by at least one subframe index of the at least one TDD-specific table. In some embodiments, the at least one subframe index equals at least one of subframe index: 0, 4 and 5. In some embodiments of this aspect, the at least one subframe index indicates the corresponding TBS to use for the SIB1-NB transmission. In some embodiments of this aspect, the TBS to use for the SIB1-NB transmission is based at least in part on a TBS table, the TBS table including:

| $I_{TBS}$ | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| TBS | 208 | 208 | 208 | 328 | 328 | 328 | 440 | 440 | 440 | 680 | 680 | 680 | 208 | 328 | 440 | 680. |

In some embodiments of this aspect, the SIB1-NB scheduling information indicates that the SIB1-NB transmission is on one of an anchor carrier and a non-anchor carrier. In some embodiments of this aspect, the at least one TDD-specific table includes at least one SIB1-NB subframe mapping table, the at least one SIB1-NB subframe mapping table defining at least one SIB1-NB subframe mapping for SIB1-NB on at least one of the anchor carrier and the non-anchor carrier. In some embodiments of this aspect, the at least one TDD-specific table is used to indicate the at least one subframe, the number of repetitions, and the TBS for the SIB1-NB transmission. In some embodiments of this aspect, the processing circuitry is further configured to cause the network node to transmit the SIB1-NB transmission according to the SIB1-NB scheduling information. In some embodiments, the number of repetitions of the SIB1-NB transmission is a number of narrowband physical downlink shared channel, PDSCH, repetitions carrying the SIB1-NB transmission.

According to another aspect of the present disclosure, a method for a network node is provided, the network node configured to include a scheduling information parameter in a master information block, MIB, and communicate the MIB to a wireless device, the scheduling information parameter usable to schedule a system information block type 1 for narrow band communication, SIB1-NB, for a time division duplex, TDD transmission. The method includes indicating the SIB1-NB scheduling information for TDD at least in part by a value of the scheduling information parameter being associated with a predefined entry in at least one TDD-specific table. The indicated SIB1-NB scheduling information includes at least one subframe to use for the SIB1-NB transmission; a number of repetitions of the SIB1-NB transmission; and a transport block size, TBS, to use for the SIB1-NB transmission.

In some embodiments of this aspect, the at least one subframe to use for the SIB1-NB transmission is indicated at least in part by at least one subframe index of the at least one TDD-specific table. In some embodiments of this aspect, the at least one subframe index equals at least one of subframe index: 0, 4 and 5. In some embodiments of this aspect, the at least one subframe index indicates the corresponding TBS to use for the SIB1-NB transmission. In some embodiments of this aspect, the TBS to use for the SIB1-NB transmission is based at least in part on a TBS table, the TBS table including:

In some embodiments of this aspect, the SIB1-NB scheduling information indicates that the SIB1-NB transmission is on one of an anchor carrier and a non-anchor carrier. In some embodiments of this aspect, the at least one TDD-specific table includes at least one SIB1-NB subframe mapping table, the at least one SIB1-NB subframe mapping table defining at least one SIB1-NB subframe mapping for SIB1-NB on at least one of the anchor carrier and the non-anchor carrier. In some embodiments of this aspect, the at least one TDD-specific table is used to indicate the at least one subframe, the number of repetitions, and the TBS for the SIB1-NB transmission. In some embodiments of this aspect, the method further includes transmitting the SIB1-NB transmission according to the SIB1-NB scheduling information. In some embodiments, the number of repetitions of the SIB1-NB transmission is a number of narrowband physical downlink shared channel, PDSCH, repetitions carrying the SIB1-NB transmission.

According to yet another aspect of the present disclosure, a wireless device, wireless device, configured to communicate with a network node to receive a scheduling information parameter in a master information block, MIB, and use the scheduling information parameter to determine scheduling for a system information block type 1 for narrow band communication, SIB1-NB, for a time division duplex, TDD transmission is provided. The wireless device includes processing circuitry configured to cause the wireless device to determine the SIB1-NB scheduling information based at least in part on a value of the scheduling information parameter being associated with a predefined entry in at least one TDD-specific table. The determined SIB1-NB scheduling information includes at least one subframe for a System Information Block Type 1-Narrow Band, SIB1-NB, transmission; a number of repetitions of the SIB1-NB transmission; and a transport block size, TBS, of the SIB1-NB transmission.

In some embodiments of this aspect, the at least one subframe for the SIB1-NB transmission is indicated at least in part by at least one subframe index of the at least one TDD-specific table. In some embodiments of this aspect, the at least one subframe index equals at least one of subframe index: 0, 4 and 5. In some embodiments of this aspect, the at least one subframe index indicates the corresponding TBS of the SIB1-NB transmission. In some embodiments of this aspect, the TBS of the SIB1-NB transmission is based at least in part on a TBS table, the TBS table including:

| $I_{TBS}$ | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| TBS | 208 | 208 | 208 | 328 | 328 | 328 | 440 | 440 | 440 | 680 | 680 | 680 | 208 | 328 | 440 | 680. |

| $I_{TBS}$ | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| TBS | 208 | 208 | 208 | 328 | 328 | 328 | 440 | 440 | 440 | 680 | 680 | 680 | 208 | 328 | 440 | 680. |

In some embodiments of this aspect, the SIB1-NB scheduling information indicates that the SIB1-NB transmission is on one of an anchor carrier and a non-anchor carrier. In some embodiments of this aspect, the at least one TDD-specific table includes at least one SIB1-NB subframe mapping table, the at least one SIB1-NB subframe mapping table defining at least one SIB1-NB subframe mapping for SIB1-NB on at least one of the anchor carrier and the non-anchor carrier. In some embodiments of this aspect, the at least one TDD-specific table indicates the at least one subframe, the number of repetitions, and the TBS of the SIB1-NB transmission. In some embodiments of this aspect, the processing circuitry is further configured to cause the wireless device to receive the SIB1-NB transmission based at least in part on the determined at least one subframe, the number of repetitions and the TBS. In some embodiments, the number of repetitions of the SIB1-NB transmission is a number of narrowband physical downlink shared channel, PDSCH, repetitions carrying the SIB1-NB transmission.

According to yet another aspect of the present disclosure, a method for a wireless device, wireless device, is provided, the wireless device being configured to communicate with a network node to receive a scheduling information parameter in a master information block, MIB, and use the scheduling information parameter to determine scheduling for a system information block type 1 for narrow band communication, SIB1-NB, for a time division duplex, TDD transmission. The method includes determining the SIB1-NB scheduling information based at least in part on a value of the scheduling information parameter being associated with a predefined entry in at least one TDD-specific table. The determined SIB1-NB scheduling information includes at least one subframe for a System Information Block Type 1-Narrow Band, SIB1-NB, transmission; a number of repetitions of the SIB1-NB transmission; and a transport block size, TBS, of the SIB1-NB transmission.

In some embodiments of this aspect, the at least one subframe for the SIB1-NB transmission is indicated at least in part by at least one subframe index of the at least one TDD-specific table. In some embodiments of this aspect, the at least one subframe index equals at least one of subframe index: 0, 4 and 5. In some embodiments of this aspect, the at least one subframe index indicates the corresponding TBS of the SIB1-NB transmission. In some embodiments of this aspect, the TBS of the SIB1-NB transmission is based at least in part on a TBS table, the TBS table including:

| $I_{TBS}$ | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| TBS | 208 | 208 | 208 | 328 | 328 | 328 | 440 | 440 | 440 | 680 | 680 | 680 | 208 | 328 | 440 | 680. |

In some embodiments of this aspect, the SIB1-NB scheduling information indicates that the SIB1-NB transmission is on one of an anchor carrier and a non-anchor carrier. In some embodiments of this aspect, the at least one TDD-specific table includes at least one SIB1-NB subframe mapping table, the at least one SIB1-NB subframe mapping table defining at least one SIB1-NB subframe mapping for SIB1-NB on at least one of the anchor carrier and the non-anchor carrier. In some embodiments of this aspect, the at least one TDD-specific table indicates the at least one subframe, the number of repetitions, and the TBS of the SIB1-NB transmission. In some embodiments of this aspect, the method further includes receiving the SIB1-NB transmission based at least in part on the determined at least one subframe, the number of repetitions and the TBS. In some embodiments, the number of repetitions of the SIB1-NB transmission is a number of narrowband physical downlink shared channel, PDSCH, repetitions carrying the SIB1-NB transmission.

According to another aspect a computer program product is provided which comprises computer readable storage medium having computer program code stored in the medium which when executed by a computer causes the computer to perform any one of the methods previously described.

According to another aspect a computer program is provided which comprises instructions which when executed on a computer cause the computer to perform any one of the methods previously described.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 2 illustrates NB-IoT anchor PRBs in in-band and guard-band operation modes;

FIG. 10 is a flowchart illustrating exemplary methods implemented in a communication system including a host computer, a network node and a wireless device for executing a client application at a wireless device according to some embodiments of the present disclosure;

FIG. 11 is a flowchart illustrating exemplary methods implemented in a communication system including a host computer, a network node and a wireless device for receiving user data at a wireless device according to some embodiments of the present disclosure;

FIG. 12 is a flowchart illustrating exemplary methods implemented in a communication system including a host computer, a network node and a wireless device for receiving user data from the wireless device at a host computer according to some embodiments of the present disclosure;

FIG. 13 is a flowchart illustrating exemplary methods implemented in a communication system including a host computer, a network node and a wireless device for receiving user data at a host computer according to some embodiments of the present disclosure;

FIG. 16 illustrates an example of anchor carrier position and RBG in different LTE bandwidth according to some embodiments of the present disclosure.

DETAILED DESCRIPTION

Figure 1:
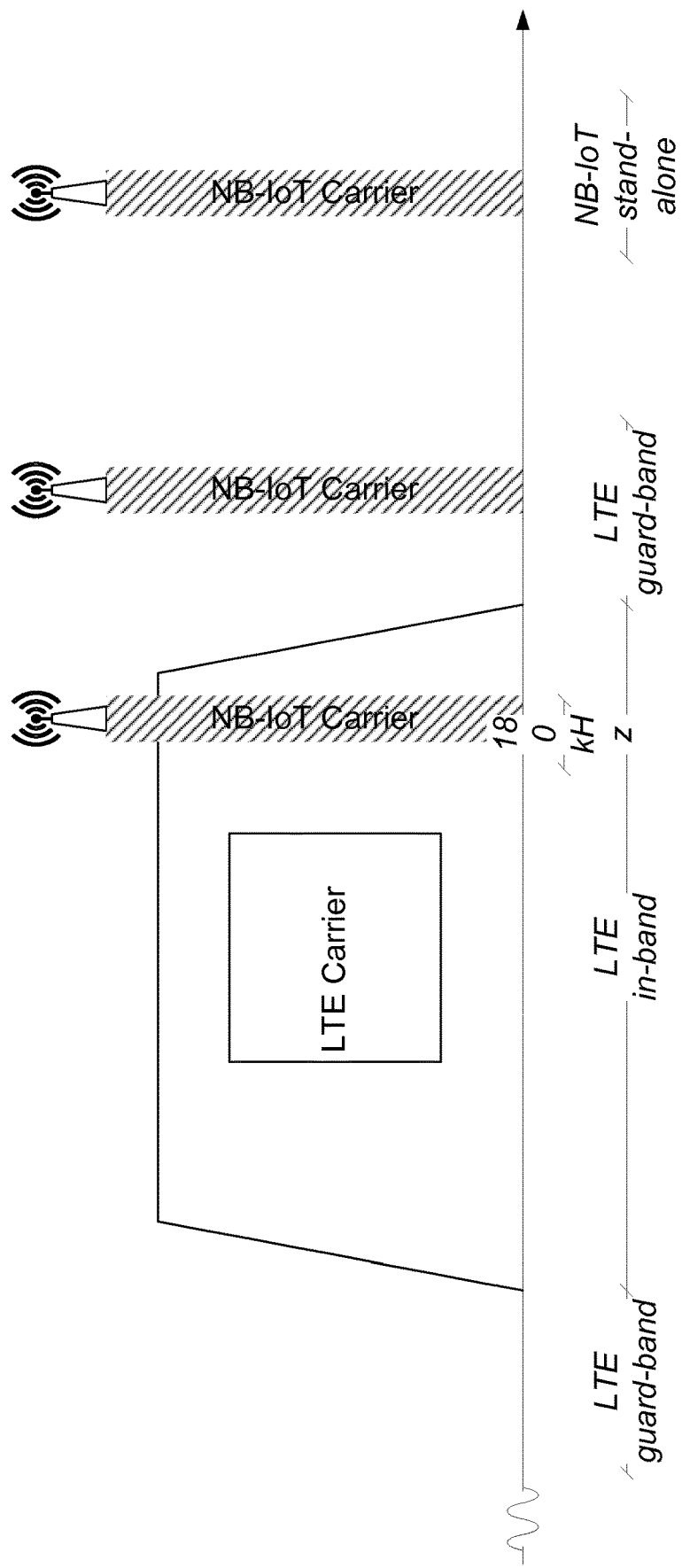
FIG. 1 illustrates NB-IoT operation modes.

If SIB1-NB is transmitted on a non-anchor carrier, MIB-NB may communicate to the wireless device the exact information of the non-anchor carrier so that the wireless device can tune its receiver to that specific carrier to receive the SIB1-NB and the other SIBs. However, a problem arises on how the network node (e.g., base-station (BS)) may use the limited amounts of spare bits in MIB-NB to indicate a SIB1-NB carrier, which can be deployed at many possible frequency positions with enormous flexibilities according to the system definition.

The conventional way of indicating a NB-IoT non-anchor carrier as defined, for example, in 3GPP Rel-14 requires 23 bits (18 bits for indicating the Evolved-Universal Terrestrial Radio Access (E-UTRA) Absolute Radio Frequency Channel Number (EARFCN) and another 5 bits for the frequency offset to the channel raster), which is not possible to fit into the MIB-NB due to the limited size of MIB-NB. There is a tradeoff between the flexibility of the SIB1-NB position and the number of bits that should be used to indicate this.

Furthermore, in legacy LTE resource allocation Type 0, which is the most commonly used resource allocation type, the physical resource blocks (PRBs) are grouped into RBGs (Resource Block Groups) to be scheduled to a wireless device (e.g., UE). Depending on the system bandwidth, the number of PRBs in each group may vary from 1 to 4. By predefining the position of the non-anchor carrier that carries the SIB1-NB, the number of bits used in the MIB-NB can be minimized. However, for the NB-IoT in-band operational scenario, it can fragment the LTE resource allocation due to the use of RBG. This is because in NB-IoT, a narrowband reference signal (NRS) is used as the downlink (DL) reference signal, which is not known to the legacy LTE wireless device. Hence, it may be that the anchor carrier and the non-anchor carrier(s) are in the same RBG for the in-band operation. That is, it may be such for in-band operation that all PRBs of a RBG are used before another RBG is used; also in RBGs where there are only non-anchor carriers.

However, for guard-band operation, due to the requirement of out-band emission, placing the anchor and non-anchor carriers at different band edges can help to reduce the complexity of the filter design, especially if the non-anchor carrier is also power boosted.

In some cases, one can also consider moving SIB1-NB transmission to non-anchor, if, for example, the paging load on the anchor carrier is high, due to its better coverage. Also, the anchor carrier in some cases can have better coverage than the non-anchor carriers due to power-boosting; therefore, it may be beneficial to move SIB1-NB to a non-anchor carrier in order to have more resources for the data channel on the anchor carrier, especially if the wireless device indicates in the msg3 that the cause of the connection is an alarm. In that case it may be of value to address these wireless devices as quickly as reasonably possible. Therefore, if SIB1-NB can be sent on the non-anchor carrier, more resources on the anchor carrier can be utilized for a data channel. To be able to do so, the configuration of SIB1-NB broadcast on non-anchor carriers could be flexible to include also higher numbers of repetitions. Repetitions, as used herein, refers to the number of narrowband physical downlink shared channel (NPDSCH) repetitions for the SIB1-NB. Stated another way, the number of repetitions of the SIB1-NB transmission may be considered the number of times NPDSCH is repeated (equally spaced) within the interval 2560 ms. It should be remembered that, generally, a wireless device only needs to re-acquire system information (SI) if there is a change in the SI, but the wireless device monitors the anchor for all kinds of mobility related measurements. As such present assumptions that it might not be necessary to support numbers of repetitions other than 16 if SIB1-NB is transmitted on the non-anchor carrier may be inaccurate. The assumption is based on the suggestion that the anchor carrier can accommodate the SIB1-NB transmission if 16 repetitions are not needed. However, the resource on the anchor carrier is very limited and so solutions which support SIB1-NB on non-anchor and with variable numbers of repetitions are desired.

Before describing in detail exemplary embodiments, it is noted that the embodiments reside primarily in combinations of apparatus components and processing steps related to indicating a subcarrier mapping and/or number of repetitions of SIB1-NB transmissions for anchor and/or non-anchor carriers in NB-IoT TDD. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device or a user equipment (UE) are used interchangeably. The wireless device herein can be any type of wireless device capable of communicating with a network node or another wireless device over radio signals, such as wireless device. The wireless device may also be a radio communication device, target device, device to device (D2D) wireless device, machine type wireless device or wireless device capable of machine to machine communication (M2M), low-cost and/or low-complexity wireless device, a sensor equipped with wireless device, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

Note that although terminology from one particular wireless system, such as, for example, 3GPP LTE, may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein. Some embodiments provide for configuring a MIB to include scheduling information indicating at least one of a subcarrier for SIB1-NB and a number of repetitions for SIB1-NB for anchor and non-anchor subcarriers in NB-IoT TDD. By implementing some of the embodiments in the NB-IoT TDD system according to the disclosure provided herein, the network may have reasonable flexibility to transmit SIB1-NB on anchor and/or non-anchor carriers for all the three operation modes at a reasonably low cost.

Figure 5:
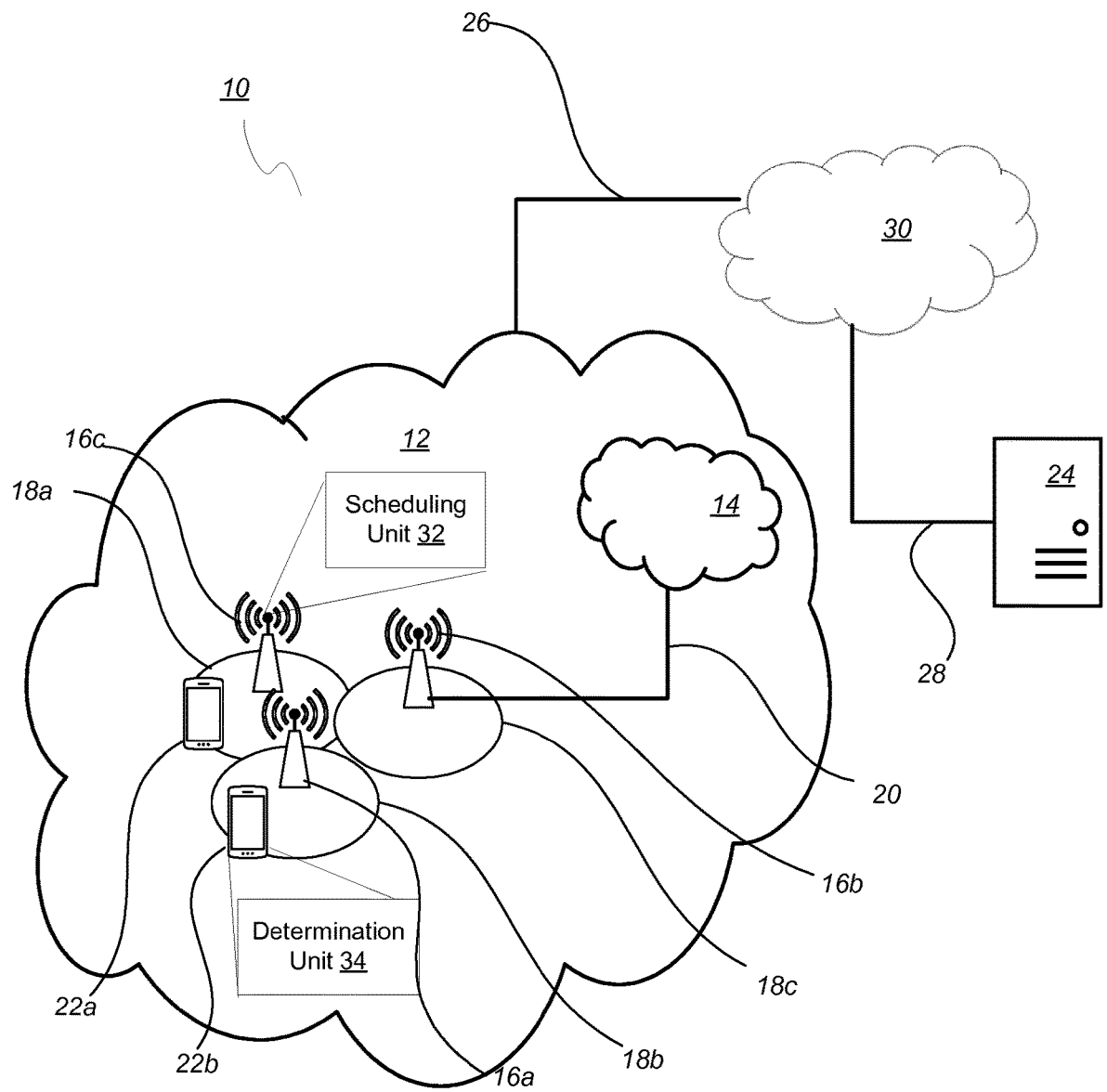
FIG. 5 is a schematic diagram of an exemplary network architecture illustrating a communication system connected via an intermediate network to a host computer according to the principles in the present disclosure.

Returning to the drawing figures, in which like elements are referred to by like reference numerals, there is shown in FIG. 5 a schematic diagram of a communication system, according to an embodiment, including a communication system 10, such as a 3GPP-type cellular network, which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device 22a located in coverage area 18a is configured to wirelessly connect to, or be paged by, the corresponding network node 16c. A second wireless device 22b in coverage area 18b is wirelessly connectable to the corresponding network node 16a. While a plurality of wireless devices 22a, 22b (collectively referred to as wireless devices 22) are illustrated in this example, the disclosed embodiments are equally applicable to a situation where a sole wireless device is in the coverage area or where a sole wireless device is connecting to the corresponding network node 16. Note that although only two wireless devices 22 and three network nodes 16 are shown for convenience, the communication system may include many more wireless devices 22 and network nodes 16.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 5 as a whole enables connectivity between one of the connected wireless devices 22a, 22b and the host computer 24. The connectivity may be described as an over-the-top (OTT) connection. The host computer 24 and the connected wireless devices 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected wireless device 22a. Similarly, the network node 16 need not be aware of the future routing of an outgoing uplink communication originating from the wireless device 22a towards the host computer 24.

A network node 16 is configured to include a scheduling unit 32 which is configured to include a scheduling information parameter in a master information block, MIB, and communicate the MIB to a wireless device 22, the scheduling information parameter usable to schedule a system information block type 1 for narrow band communication, SIB1-NB, for a time division duplex, TDD transmission. In some examples the scheduling information parameter is a schedulingInfoSIB1 information element. The scheduling unit 32 is configured to indicate the SIB1-NB scheduling information for TDD at least in part by a value of the scheduling information parameter (e.g., a schedulingInfoSIB1 information element) being associated with a predefined entry in at least one TDD-specific table, the indicated SIB1-NB scheduling information including: at least one subframe to use for the SIB1-NB transmission; a number of repetitions of the SIB1-NB transmission (i.e., the number of repetitions of NPDSCH carrying SIB1-NB transmission); and a transport block size, TBS, to use for the SIB1-NB transmission.

In another embodiment, scheduling unit 32 is configured to communicate a Master Information Block (MIB) that includes scheduling information indicating at least one of a subcarrier for System Information Block Type 1-Narrow Band (SIB1-NB) transmissions and a number of repetitions of SIB1-NB transmissions for Narrow Band-Internet of Things (NB-IoT) Time Division Duplex (TDD).

A wireless device 22 is configured to include a determination unit 34 which is configured to communicate with a network node 16 to receive a scheduling information parameter (e.g., a schedulingInfoSIB1 information element) in a master information block, MIB, and use the scheduling information parameter to determine scheduling for a system information block type 1 for narrow band communication, SIB1-NB, for a time division duplex, TDD transmission. The determination unit 34 is configured to determine the SIB1-NB scheduling information based at least in part on a value of the scheduling information parameter being associated with a predefined entry in at least one TDD-specific table. The determined SIB1-NB scheduling information including: at least one subframe for a System Information Block Type 1-Narrow Band, SIB1-NB, transmission; a number of repetitions of the SIB1-NB transmission (i.e., the number of repetitions of NPDSCH carrying SIB1-NB transmission); and a transport block size, TBS, of the SIB1-NB transmission.

In another embodiment, determination unit 34 is configured to receive MIB with scheduling information and, based on at least the scheduling information, determine at least one of a subcarrier for System Information Block Type 1-Narrow Band (SIB1-NB) transmissions and a number of repetitions of SIB1-NB transmissions in Narrow Band-Internet of Things (NB-IoT) Time Division Duplex (TDD).

Figure 2:
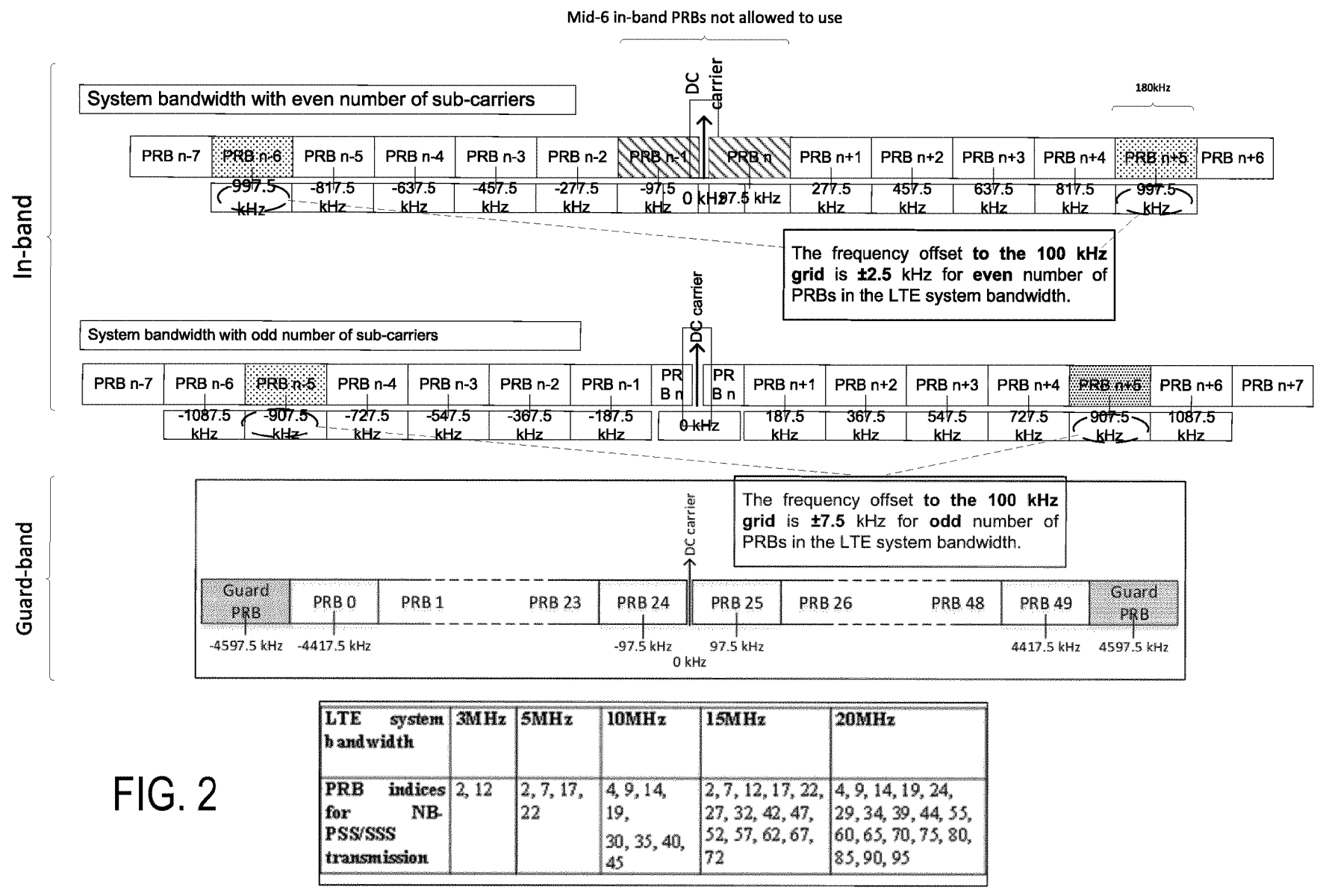

Example implementations, in accordance with an embodiment, of the wireless device 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to a traditional processor and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a wireless device 22 connecting via an OTT connection 52 terminating at the wireless device 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and/or the wireless device 22. The processing circuitry 42 of the host computer 24 may include a monitor unit 54 configured to enable the service provider monitor the network node 16 and/or the wireless device 22.

The communication system 10 further includes a network node 16 provided in a communication system 10 and comprising hardware 58 enabling it to communicate with the host computer 24 and with the wireless device 22. The hardware 58 may include a communication interface 60 for setting up and maintaining a wired or wireless connection with an interface of a different communication device of the communication system 10, as well as a radio interface 62 for setting up and maintaining at least a wireless connection 64 with a wireless device 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to a traditional processor and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include the scheduling unit 32 configured to include a scheduling information parameter (e.g., a schedulingInfoSIB1 information element) in a master information block, MIB, and communicate the MIB to a wireless device 22, the scheduling information parameter usable to schedule a system information block type 1 for narrow band communication, SIB1-NB, for a time division duplex, TDD transmission. The scheduling unit 32 is configured to indicate the SIB1-NB scheduling information for TDD at least in part by a value of the scheduling information parameter being associated with a predefined entry in at least one TDD-specific table. The indicated SIB1-NB scheduling information including: at least one subframe to use for the SIB1-NB transmission; a number of repetitions of the SIB1-NB transmission (i.e., the number of repetitions of NPDSCH carrying SIB1-NB transmission); and a transport block size, TBS, to use for the SIB1-NB transmission.

In some embodiments, the at least one subframe to use for the SIB1-NB transmission is indicated at least in part by at least one subframe index of the at least one TDD-specific table. In some embodiments, the at least one subframe index equals at least one of subframe index: 0, 4 and 5. In some embodiments, the at least one subframe index indicates the corresponding TBS to use for the SIB1-NB transmission. In some embodiments, the TBS to use for the SIB1-NB transmission is based at least in part on a TBS table, the TBS table including:

| $I_{TBS}$ | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| TBS | 208 | 208 | 208 | 328 | 328 | 328 | 440 | 440 | 440 | 680 | 680 | 680 | 208 | 328 | 440 | 680. |

In some embodiments, the SIB1-NB scheduling information indicates that the SIB1-NB transmission is on one of an anchor carrier and a non-anchor carrier. In some embodiments, the at least one TDD-specific table includes at least one SIB1-NB subframe mapping table, the at least one SIB1-NB subframe mapping table defining at least one SIB1-NB subframe mapping for SIB1-NB on at least one of the anchor carrier and the non-anchor carrier. In some embodiments, the at least one TDD-specific table is used to indicate the at least one subframe, the number of repetitions, and the TBS for the SIB1-NB transmission. In some embodiments, the processing circuitry 68 is further configured to cause the network node 16 to transmit the SIB1-NB transmission according to the SIB1-NB scheduling information. In some embodiments, the number of repetitions of the SIB1-NB transmission is a number of narrowband physical downlink shared channel, PDSCH, repetitions carrying the SIB1-NB transmission.

In another embodiment, scheduling unit 32 may be configured to communicate a Master Information Block (MIB) that includes scheduling information indicating at least one of a subcarrier for System Information Block Type 1-Narrow Band (SIB1-NB) transmissions and a number of repetitions of SIB1-NB transmissions for Narrow Band-Internet of Things (NB-IoT) Time Division Duplex (TDD). In some embodiments, the scheduling information is included in at least a portion of a table indicating the number of repetitions for SIB1-NB. In some embodiments, the at least the portion of the table is associated with at least one reserve value field corresponding to at least one of values 12-15 of SIB1 scheduling information values of the table. In some embodiments, the scheduling information indicates which subframe is used for the SIB1-NB. In some embodiments, the scheduling information indicates at least one subframe for SIB1-NB on an anchor carrier and at least one subframe for SIB1-NB on a non-anchor carrier. In some embodiments, the scheduling information indicates whether the at least one carrier is an anchor carrier or a non-anchor carrier. In some embodiments, the scheduling information indicates a TDD-specific table. In some embodiments, the scheduling information indicates at least one SIB1-NB subframe mapping table defining at least one SIB1-NB subframe mapping for SIB1-NB on at least one of the anchor and the non-anchor carriers.

The communication system 10 further includes the wireless device 22 already referred to. The wireless device 22 may have hardware 80 that may include a radio interface 82 configured to set up and maintain a wireless connection 64 with a network node 16 serving a coverage area 18 in which the wireless device 22 is currently located. The radio interface 82 may be formed as or may include, for example, one or more RF transmitters, one or more RF receivers, and/or one or more RF transceivers.

The hardware 80 of the wireless device 22 further includes processing circuitry 84. The processing circuitry 84 may include a processor 86 and memory 88. In particular, in addition to a traditional processor and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the wireless device 22 may further comprise software 90, which is stored in, for example, memory 88 at the wireless device 22, or stored in external memory (e.g., database) accessible by the wireless device 22. The software 90 may be executable by the processing circuitry 84. The software 90 may include a client application 92. The client application 92 may be operable to provide a service to a human or non-human user via the wireless device 22, with the support of the host computer 24. In the host computer 24, an executing host application 50 may communicate with the executing client application 92 via the OTT connection 52 terminating at the wireless device 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by wireless device 22. The processor 86 corresponds to one or more processors 86 for performing wireless device 22 functions described herein. The wireless device 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to wireless device 22. For example, the processing circuitry 84 of the wireless device 22 may include a determination unit 34 configured to cause the wireless device 22 to communicate with a network node 16 to receive a scheduling information parameter (e.g., a schedulingInfoSIB1 information element) in a master information block, MIB, and use the scheduling information parameter to determine scheduling for a system information block type 1 for narrow band communication, SIB1-NB, for a time division duplex, TDD transmission. The determination unit 34 is configured to determine the SIB1-NB scheduling information based at least in part on a value of the scheduling information parameter being associated with a predefined entry in at least one TDD-specific table. The determined SIB1-NB scheduling information including: at least one subframe for a System Information Block Type 1-Narrow Band, SIB1-NB, transmission; a number of repetitions of the SIB1-NB transmission (i.e., the number of repetitions of NPDSCH carrying SIB1-NB transmission); and a transport block size, TBS, of the SIB1-NB transmission.

In some embodiments, the at least one subframe for the SIB1-NB transmission is indicated at least in part by at least one subframe index of the at least one TDD-specific table. In some embodiments, the at least one subframe index equals at least one of subframe index: 0, 4 and 5. In some embodiments, the at least one subframe index indicates the corresponding TBS of the SIB1-NB transmission. In some embodiments, the TBS of the SIB1-NB transmission is based at least in part on a TBS table, the TBS table including:

| $I_{TBS}$ | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| TBS | 208 | 208 | 208 | 328 | 328 | 328 | 440 | 440 | 440 | 680 | 680 | 680 | 208 | 328 | 440 | 680. |

In some embodiments, the SIB1-NB scheduling information indicates that the SIB1-NB transmission is on one of an anchor carrier and a non-anchor carrier. In some embodiments, the at least one TDD-specific table includes at least one SIB1-NB subframe mapping table, the at least one SIB1-NB subframe mapping table defining at least one SIB1-NB subframe mapping for SIB1-NB on at least one of the anchor carrier and the non-anchor carrier. In some embodiments, the at least one TDD-specific table indicates the at least one subframe, the number of repetitions, and the TBS of the SIB1-NB transmission. In some embodiments, the processing circuitry 84 is further configured to cause the wireless device 22 to receive the SIB1-NB transmission based at least in part on the determined at least one subframe, the number of repetitions and the TBS. In some embodiments, the number of repetitions of the SIB1-NB transmission is a number of narrowband physical downlink shared channel, PDSCH, repetitions carrying the SIB1-NB transmission.

In another embodiment, determination unit 34 is configured to receive a MIB with scheduling information and, based on at least the scheduling information, determine at least one of a subcarrier for System Information Block Type 1-Narrow Band (SIB1-NB) transmissions and a number of repetitions of SIB1-NB transmissions in Narrow Band-Internet of Things (NB-IoT) Time Division Duplex (TDD).

In some embodiments, the scheduling information is included in at least a portion of a table indicating the number of repetitions for SIB1-NB. In some embodiments, the at least the portion of the table is associated with at least one reserve value field corresponding to at least one of values 12-15 of SIB1 scheduling information values of the table. In some embodiments, the scheduling information indicates which subframe is used for the SIB1-NB. In some embodiments, the scheduling information indicates at least one subframe for SIB1-NB on an anchor carrier and at least one subframe for SIB1-NB on a non-anchor carrier. In some embodiments, the scheduling information indicates whether the at least one carrier is an anchor carrier or a non-anchor carrier. In some embodiments, the scheduling information indicates a TDD-specific table. In some embodiments, the scheduling information indicates at least one SIB1-NB subframe mapping table defining at least one SIB1-NB subframe mapping for SIB1-NB on at least one of the anchor and the non-anchor carriers.

Figure 6:
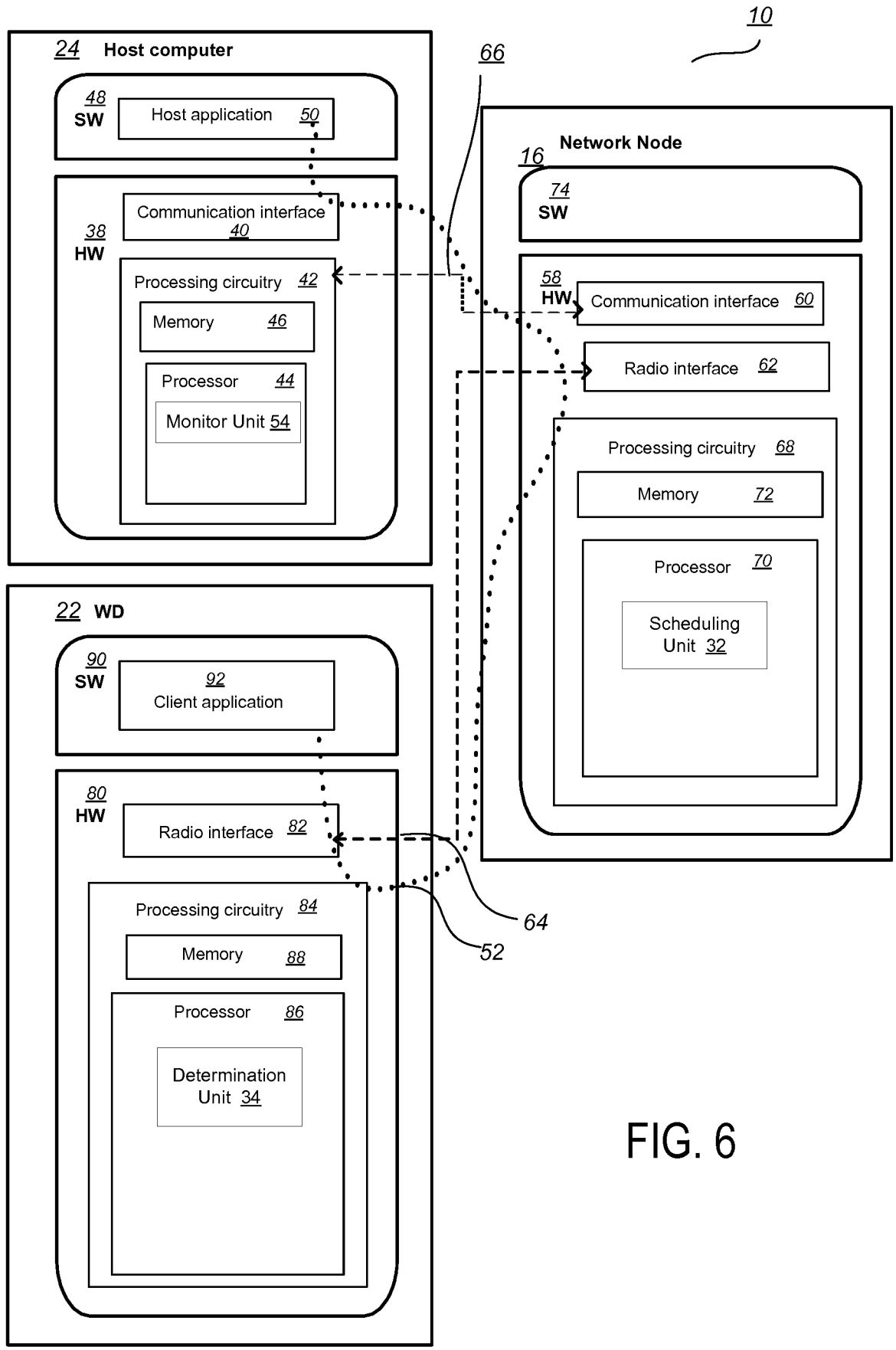
FIG. 6 is a block diagram of a host computer communicating via a network node with a wireless device over an at least partially wireless connection according to some embodiments of the present disclosure.

In some embodiments, the inner workings of the network node 16, wireless device 22, and host computer 24 may be as shown in FIG. 6 and independently, the surrounding network topology may be that of FIG. 5.

In FIG. 6, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the wireless device 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the wireless device 22 and the network node 16 is in accordance with the teachings of the embodiments described throughout this disclosure. One or more of the various embodiments improve the performance of OTT services provided to the wireless device 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and wireless device 22, in response to variations in the measurement results. The measurement procedure and/or the network functionality for reconfiguring the OTT connection 52 may be implemented in the software 48 of the host computer 24 or in the software 90 of the wireless device 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary wireless device signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Although FIGS. 5 and 6 show various "units" such as scheduling unit 32, and determination unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 7:
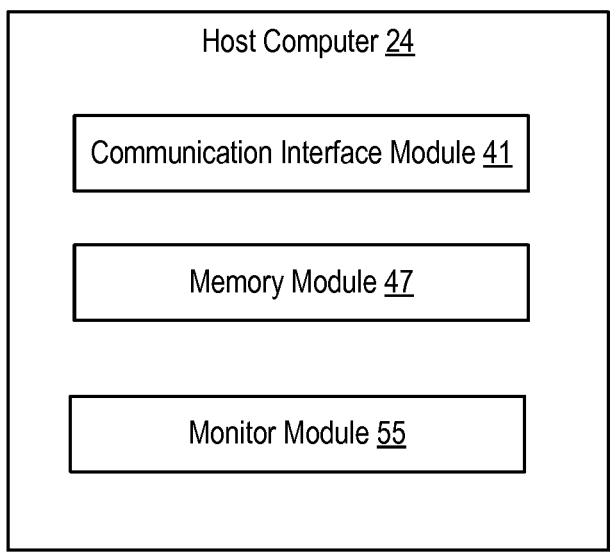
FIG. 7 is a block diagram of an alternative embodiment of a host computer according to some embodiments of the present disclosure.

FIG. 7 is a block diagram of an alternative host computer 24, which may be implemented at least in part by software modules containing software executable by a processor to perform the functions described herein. The host computer 24 include a communication interface module 41 configured to set up and maintain a wired or wireless connection with an interface of a different communication device of the communication system 10. The memory module 47 is configured to store data, programmatic software code and/or other information described herein. Monitor module 55 is configured to enable the service provider to monitor the network node 16 and/or the wireless device 22.

Figure 8:
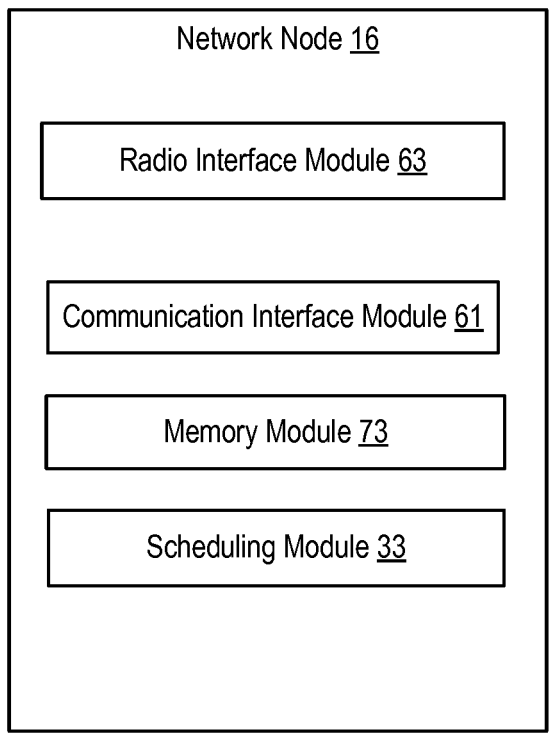
FIG. 8 is a block diagram of an alternative embodiment of a network node according to some embodiments of the present disclosure.

FIG. 8 is a block diagram of an alternative network node 16, which may be implemented at least in part by software modules containing software executable by a processor to perform the functions described herein. The network node 16 includes a radio interface module 63 configured for setting up and maintaining at least a wireless connection 64 with a wireless device 22 located in a coverage area 18 served by the network node 16. The network node 16 also includes a communication interface module 61 configured for setting up and maintaining a wired or wireless connection with an interface of a different communication device of the communication system 10. The communication interface module 61 may also be configured to facilitate a connection 66 to the host computer 24. The memory module 73 that is configured to store data, programmatic software code and/or other information described herein. The scheduling module 33 is configured to communicate a Master Information Block (MIB) that includes scheduling information indicating at least one of a subcarrier for System Information Block Type 1-Narrow Band (SIB1-NB) transmissions and a number of repetitions of SIB1-NB transmissions for Narrow Band-Internet of Things (NB-IoT) Time Division Duplex (TDD).

Figure 9:
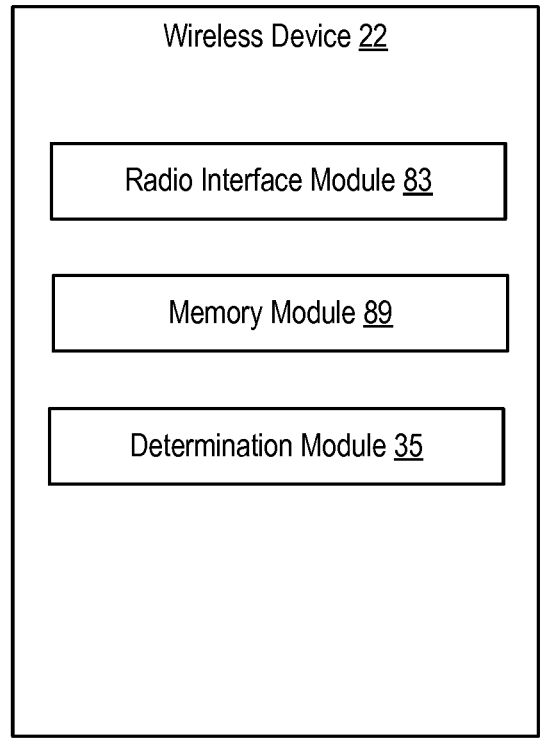
FIG. 9 is a block diagram of an alternative embodiment of a wireless device according to some embodiments of the present disclosure.

FIG. 9 is a block diagram of an alternative wireless device 22, which may be implemented at least in part by software modules containing software executable by a processor to perform the functions described herein. The wireless device 22 includes a radio interface module 83 configured to set up and maintain a wireless connection 64 with a network node 16 serving a coverage area 18 in which the wireless device 22 is currently located. The memory module 89 is configured to store data, programmatic software code and/or other information described herein. The determination module 35 is configured to, based on at least the scheduling information, determine at least one of a subcarrier for System Information Block Type 1-Narrow Band (SIB1-NB) transmissions and a number of repetitions of SIB1-NB transmissions in Narrow Band-Internet of Things (NB-IoT) Time Division Duplex (TDD).

FIG. 10 is a flowchart illustrating an exemplary method implemented in a communication system, such as, for example, the communication system of FIGS. 5 and 6, in accordance with one embodiment. The communication system may include a host computer 24, a network node 16 and a wireless device 22, which may be those described with reference to FIG. 6. In a first step of the method, the host computer 24 provides user data (block S100). In an optional substep of the first step, the host computer 24 provides the user data by executing a host application, such as, for example, the host application 74 (block S102). In a second step, the host computer 24 initiates a transmission carrying the user data to the wireless device 22 (block S104). In an optional third step, the network node 16 transmits to the wireless device 22 the user data which was carried in the transmission that the host computer 24 initiated, in accordance with the teachings of the embodiments described throughout this disclosure (block S106). In an optional fourth step, the wireless device 22 executes a client application, such as, for example, the client application 114, associated with the host application 74 executed by the host computer 24 (block S108).

FIG. 11 is a flowchart illustrating an exemplary method implemented in a communication system, such as, for example, the communication system of FIG. 5, in accordance with one embodiment. The communication system may include a host computer 24, a network node 16 and a wireless device 22, which may be those described with reference to FIGS. 5 and 6. In a first step of the method, the host computer 24 provides user data (block S110). In an optional substep (not shown) the host computer 24 provides the user data by executing a host application, such as, for example, the host application 74. In a second step, the host computer 24 initiates a transmission carrying the user data to the wireless device 22 (block S112). The transmission may pass via the network node 16, in accordance with the teachings of the embodiments described throughout this disclosure. In an optional third step, the wireless device 22 receives the user data carried in the transmission (block S114).

FIG. 12 is a flowchart illustrating an exemplary method implemented in a communication system, such as, for example, the communication system of FIG. 5, in accordance with one embodiment. The communication system may include a host computer 24, a network node 16 and a wireless device 22, which may be those described with reference to FIGS. 5 and 6. In an optional first step of the method, the wireless device 22 receives input data provided by the host computer 24 (block S116). In an optional substep of the first step, the wireless device 22 executes the client application 114, which provides the user data in reaction to the received input data provided by the host computer 24 (block S118). Additionally or alternatively, in an optional second step, the wireless device 22 provides user data (block S120). In an optional substep of the second step, the wireless device provides the user data by executing a client application, such as, for example, client application 114 (block S122). In providing the user data, the executed client application 114 may further consider user input received from the user. Regardless of the specific manner in which the user data was provided, the wireless device 22 may initiate, in an optional third substep, transmission of the user data to the host computer 24 (block S124). In a fourth step of the method, the host computer 24 receives the user data transmitted from the wireless device 22, in accordance with the teachings of the embodiments described throughout this disclosure (block S126).

FIG. 13 is a flowchart illustrating an exemplary method implemented in a communication system, such as, for example, the communication system of FIG. 5, in accordance with one embodiment. The communication system may include a host computer 24, a network node 16 and a wireless device 22, which may be those described with reference to FIGS. 5 and 6. In an optional first step of the method, in accordance with the teachings of the embodiments described throughout this disclosure, the network node 16 receives user data from the wireless device 22 (block S128). In an optional second step, the network node 16 initiates transmission of the received user data to the host computer 24 (block S130). In a third step, the host computer 24 receives the user data carried in the transmission initiated by the network node 16 (block S132).

Figure 14:
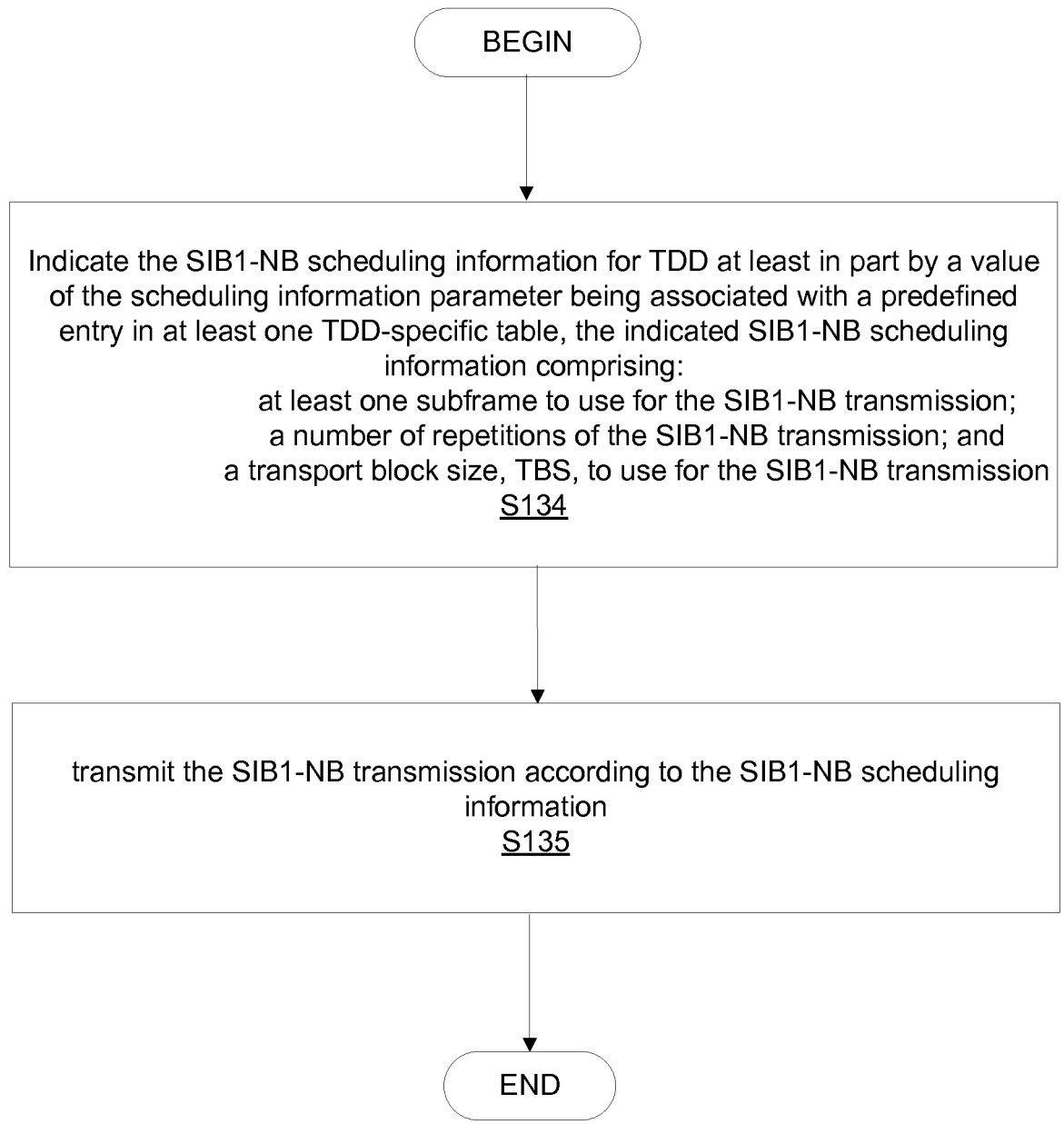
FIG. 14 is a flowchart of an exemplary process in a network node according to some embodiments of the present disclosure.

FIG. 14 is a flowchart of an exemplary process in a network node 16 according to some embodiments of the present disclosure. One or more Blocks and/or functions and/or methods performed by the network node 16 may be performed by one or more elements of network node 16 such as by scheduling unit 32 in processing circuitry 68, processor 70, radio interface 62, etc. according to the example method. The example method may include, in e.g., a network node 16 configured to include a scheduling information parameter (e.g., a schedulingInfoSIB1 information element) in a master information block, MIB, and communicate the MIB to a wireless device (22), the scheduling information parameter usable to schedule a system information block type 1 for narrow band communication, SIB1-NB, for a time division duplex, TDD transmission, indicating (block S134), such as via radio interface 62 and/or processing circuitry 68, the SIB1-NB scheduling information for TDD at least in part by a value of the scheduling information parameter being associated with a predefined entry in at least one TDD-specific table, the indicated SIB1-NB scheduling information comprising: at least one subframe to use for the SIB1-NB transmission; a number of repetitions of the SIB1-NB transmission (i.e., the number of repetitions of NPDSCH carrying SIB1-NB transmission); and a transport block size, TBS, to use for the SIB1-NB transmission.

In some embodiments, the at least one subframe to use for the SIB1-NB transmission is indicated at least in part by at least one subframe index of the at least one TDD-specific table. In some embodiments, the at least one subframe index equals at least one of subframe index: 0, 4 and 5. In some embodiments, the at least one subframe index indicates the corresponding TBS to use for the SIB1-NB transmission. In some embodiments, the TBS to use for the SIB1-NB transmission is based at least in part on a TBS table, the TBS table including:

| $I_{TBS}$ | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| TBS | 208 | 208 | 208 | 328 | 328 | 328 | 440 | 440 | 440 | 680 | 680 | 680 | 208 | 328 | 440 | 680. |

In some embodiments, the SIB1-NB scheduling information indicates that the SIB1-NB transmission is on one of an anchor carrier and a non-anchor carrier. In some embodiments, the at least one TDD-specific table includes at least one SIB1-NB subframe mapping table, the at least one SIB1-NB subframe mapping table defining at least one SIB1-NB subframe mapping for SIB1-NB on at least one of the anchor carrier and the non-anchor carrier. In some embodiments, the at least one TDD-specific table is used to indicate the at least one subframe, the number of repetitions, and the TBS for the SIB1-NB transmission. In some embodiments, the process optionally includes the network node transmitting (block S135), such as via radio interface 62 and/or processing circuitry 68, the SIB1-NB transmission according to the SIB1-NB scheduling information. In some embodiments, the number of repetitions of the SIB1-NB transmission is a number of narrowband physical downlink shared channel, PDSCH, repetitions carrying the SIB1-NB transmission.

and/or processing circuitry 84, the SIB1-NB scheduling information based at least in part on a value of the scheduling information parameter being associated with a predefined entry in at least one TDD-specific table, the determined SIB1-NB scheduling information comprising: at least one subframe for a System Information Block Type 1-Narrow Band, SIB1-NB, transmission; a number of repetitions of the SIB1-NB transmission (i.e., the number of repetitions of NPDSCH carrying SIB1-NB transmission); and a transport block size, TBS, of the SIB1-NB transmission.

In some embodiments, the at least one subframe for the SIB1-NB transmission is indicated at least in part by at least one subframe index of the at least one TDD-specific table. In some embodiments, the at least one subframe index equals at least one of: 0, 4 and 5. In some embodiments, the at least one subframe index indicates the corresponding TBS of the SIB1-NB transmission. In some embodiments, the TBS of the SIB1-NB transmission is based at least in part on a TBS table, the TBS table including:

| $I_{TBS}$ | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| TBS | 208 | 208 | 208 | 328 | 328 | 328 | 440 | 440 | 440 | 680 | 680 | 680 | 208 | 328 | 440 | 680. |

In another embodiment, the method may include communicating a Master Information Block (MIB) that includes scheduling information indicating at least one of a subcarrier for System Information Block Type 1-Narrow Band (SIB1-NB) transmissions and a number of repetitions of SIB1-NB transmissions for Narrow Band-Internet of Things (NB-IoT) Time Division Duplex (TDD). In some embodiments, the scheduling information is included in at least a portion of a table indicating the number of repetitions for SIB1-NB. In some embodiments, the at least the portion of the table is associated with at least one reserve value field corresponding to at least one of values 12-15 of SIB1 scheduling information values of the table. In some embodiments, the scheduling information indicates which subframe is used for the SIB1-NB. In some embodiments, the scheduling information indicates at least one subframe for SIB1-NB on an anchor carrier and at least one subframe for SIB1-NB on a non-anchor carrier. In some embodiments, the scheduling information indicates whether the at least one carrier is an anchor carrier or a non-anchor carrier. In some embodiments, the scheduling information indicates a TDD-specific table. In some embodiments, the scheduling information indicates at least one SIB1-NB subframe mapping table defining at least one SIB1-NB subframe mapping for SIB1-NB on at least one of the anchor and the non-anchor carriers.

Figure 15:
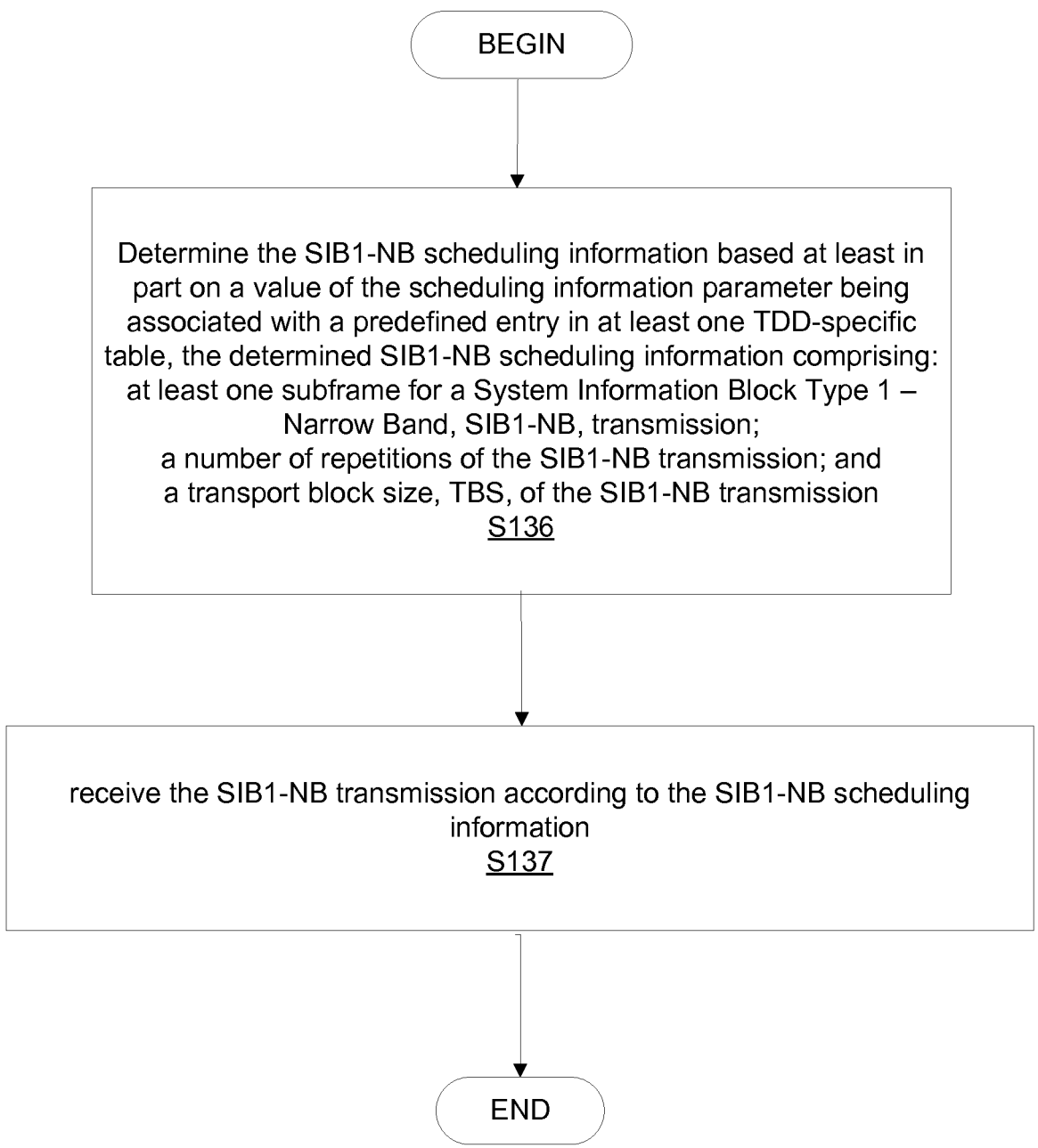
FIG. 15 is a flowchart of an exemplary process in a wireless device determining scheduling information from a MIB, according to some embodiments of the present disclosure.

FIG. 15 is a flowchart of an exemplary process in a wireless device 22 according to some embodiments of the present disclosure. One or more Blocks and/or functions and/or methods performed by wireless device 22 may be performed by one or more elements of wireless device 22 such as by determination unit 34 in processing circuitry 84, processor 86, radio interface 82, etc., according to the example method. The example method may include, in a wireless device 22 configured to communicate with a network node 16 to receive a scheduling information parameter (e.g., a schedulingInfoSIB1 information element) in a master information block, MIB, and use the scheduling information parameter to determine scheduling for a system information block type 1 for narrow band communication, SIB1-NB, for a time division duplex, TDD transmission, determining (block S136), such as via determination unit 34

In some embodiments, the SIB1-NB scheduling information indicates that the SIB1-NB transmission is on one of an anchor carrier and a non-anchor carrier. In some embodiments, the at least one TDD-specific table includes at least one SIB1-NB subframe mapping table, the at least one SIB1-NB subframe mapping table defining at least one SIB1-NB subframe mapping for SIB1-NB on at least one of the anchor carrier and the non-anchor carrier. In some embodiments, the at least one TDD-specific table indicates the at least one subframe, the number of repetitions, and the TBS of the SIB1-NB transmission. The process optionally includes receiving (block S137), such as via radio interface 82 and/or processing circuitry 84, the SIB1-NB transmission according to the SIB1-NB scheduling information. In some examples, receiving the SIB1-NB transmission based at least in part on the determined at least one subframe, the number of repetitions and the TBS. In some embodiments, the number of repetitions of the SIB1-NB transmission is a number of narrowband physical downlink shared channel, PDSCH, repetitions carrying the SIB1-NB transmission.

In another embodiment, the method may include receiving a Master Information Block (MIB) that includes scheduling information. The process may further include, based on at least the scheduling information, determining at least one of a subcarrier for System Information Block Type 1-Narrow Band (SIB1-NB) transmissions and a number of repetitions of SIB1-NB transmissions in Narrow Band-Internet of Things (NB-IoT) Time Division Duplex (TDD). In some embodiments, the scheduling information is included in at least a portion of a table indicating the number of repetitions for SIB1-NB. In some embodiments, the at least the portion of the table is associated with at least one reserve value field corresponding to at least one of values 12-15 of SIB1 scheduling information values of the table. In some embodiments, the scheduling information indicates which subframe is used for the SIB1-NB. In some embodiments, the scheduling information indicates at least one subframe for SIB1-NB on an anchor carrier and at least one subframe for SIB1-NB on a non-anchor carrier. In some embodiments, the scheduling information indicates whether the at least one carrier is an anchor carrier or a non-anchor carrier. In some embodiments, the scheduling information indicates a TDD-specific table. In some embodiments, the scheduling information indicates at least one SIB1-NB subframe mapping table defining at least one SIB1-NB subframe mapping for SIB1-NB on at least one of the anchor and the non-anchor carriers.

Having generally described some embodiments of the present disclosure, a more detailed description of some of the embodiments is provided herein below.

In some embodiments, in a NB-IoT TDD system, after acquisition of MIB-NB, the wireless device 22 (e.g., UE) is configured to determine whether SIB1-NB is transmitted on the anchor carrier (i.e., the NB-IoT carrier where the wireless device 22 detects the NPSS and NSSS and decodes NPBCH), or if the SIB1-NB is transmitted on a non-anchor carrier instead. In some embodiments, if the SIB1-NB is transmitted on a non-anchor carrier, the wireless device 22 can determine the exact location of the non-anchor carrier on which SIB1-NB is transmitted. Such information may be provided in the MIB-NB. The below exemplary Abstract Syntax Notation One (ASN.1) provides a definition of MIB-NB for NB-IoT FDD. Embodiments of the present disclosure may be described based on the current MIB1-NB for FDD, but it should be understood that some embodiments for TDD may be different.

```
MasterInformationBlock-NB
-- ASN1START
MasterInformationBlock-NB ::=       SEQUENCE {
    systemFrameNumber-MSB-r13       BIT STRING (SIZE (4)),
    hyperSFN-LSB-r13                BIT STRING (SIZE (2)),
    schedulingInfoSIB1-r13          INTEGER (0..15),
    systemInfoValueTag-r13          INTEGER (0..31),
    ab-Enabled-r13                  BOOLEAN,
    operationModeInfo-r13           CHOICE {
        inband-SamePCI-r13              Inband-SamePCI-NB-r13,
        inband-DifferentPCI-r13         Inband-DifferentPCI-NB-r13,
        guardband-r13                   Guardband-NB-r13,
        standalone-r13                  Standalone-NB-r13
    },
    spare                           BIT STRING (SIZE (11))
}
ChannelRasterOffset-NB-r13 ::= ENUMERATED {khz-7dot5, khz-2dot5, khz2dot5, khz7dot5}
Guardband-NB-r13 ::=                SEQUENCE {
    rasterOffset-r13                ChannelRasterOffset-NB-r13,
    spare                           BIT STRING (SIZE (3))
}
Inband-SamePCI-NB-r13 ::=           SEQUENCE {
    eutra-CRS-SequenceInfo-r13      INTEGER (0..31)
}
Inband-DifferentPCI-NB-r13 ::=      SEQUENCE {
    eutra-NumCRS-Ports-r13          ENUMERATED {same, four},
    rasterOffset-r13                ChannelRasterOffset-NB-r13,
    spare                           BIT STRING (SIZE (2))
}
Standalone-NB-r13 ::=               SEQUENCE {
    spare                           BIT STRING (SIZE (5))
}
-- ASN1STOP
```

It has been considered that it may not be necessary to support numbers of repetitions other than 16 if SIB1-NB is transmitted on the non-anchor carrier. Proponents for such approach have stated that this is because the anchor carrier can accommodate the SIB1-NB transmission if 16 repetitions are not needed. However, this statement may be considered inaccurate, because the anchor carrier in some cases can have better coverage than the non-anchor carrier; therefore, it may be beneficial to have more resources for the data channel on the anchor carrier, especially if the wireless device 22 indicates in the msg3 that the cause of the connection is an alarm. In that case, it is preferred to address these wireless devices 22 as quick as possible. Therefore, if SIB1-NB can be sent on the non-anchor carrier, more resources on the anchor carrier can be utilized for the data channel. It should be remembered that a wireless device 22 generally only needs to reacquire SI if there is a change in the SI, but monitors the anchor for all kinds of mobility related measurements. With that being said, advantageously, some embodiments of the present disclosure provide for the flexibility of supporting different numbers of repetitions of SIB1-NB transmissions on the non-anchor carrier that do not require more bits in the MIB.

In some embodiments, the schedulingInfoSIB1-r13 contains 16 different values, and indicates the number of repetitions used by SIB1-NB in FDD (see for example Table 1 herein below). As can be seen from Table 1, there are 4 reserved values. In some embodiments, these values may be used to indicate additional configurations, e.g., the subframes that can be used for SIB1-NB transmission in NB-IoT TDD. Notice that SIB1 schedulinginfo values 0-2, 3-5, 6-8, and 9-11 may correspond to different SIB1-NB transport block (TB) sizes.

TABLE 1

Number of Narrowband Physical Downlink Shared Channel (NPDSCH) repetitions for SIB1-NB in FDD

| Value of schedulingInfoSIB1 | Number of NPDSCH repetitions |
| --- | --- |
| 0 | 4 |
| 1 | 8 |
| 2 | 16 |
| 3 | 4 |
| 4 | 8 |
| 5 | 16 |
| 6 | 4 |
| 7 | 8 |
| 8 | 16 |
| 9 | 4 |
| 10 | 8 |
| 11 | 16 |
| 12-15 | Reserved |

Figure 3:
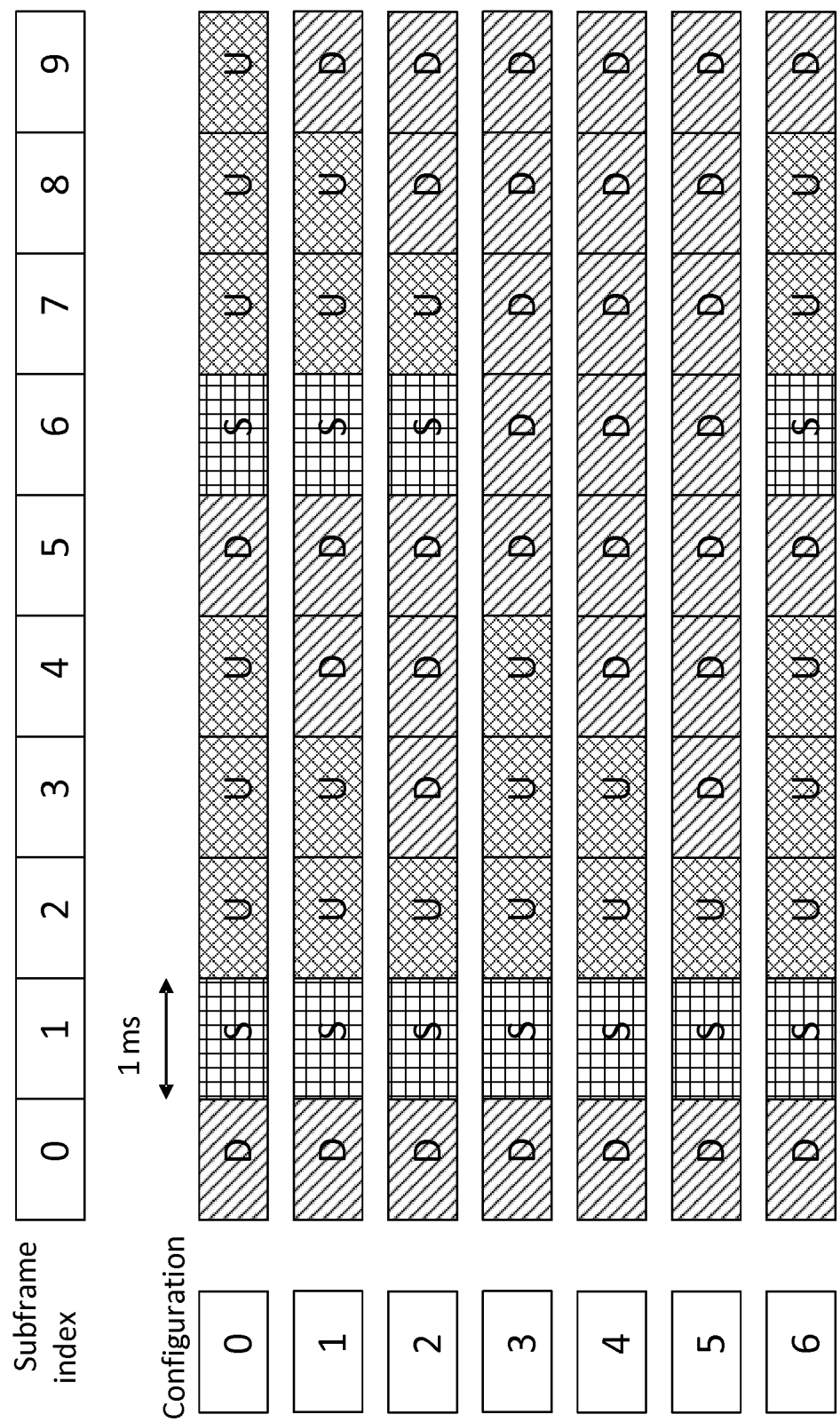
FIG. 3 illustrates LTE-TDD uplink-downlink configuration.
Figure 4:
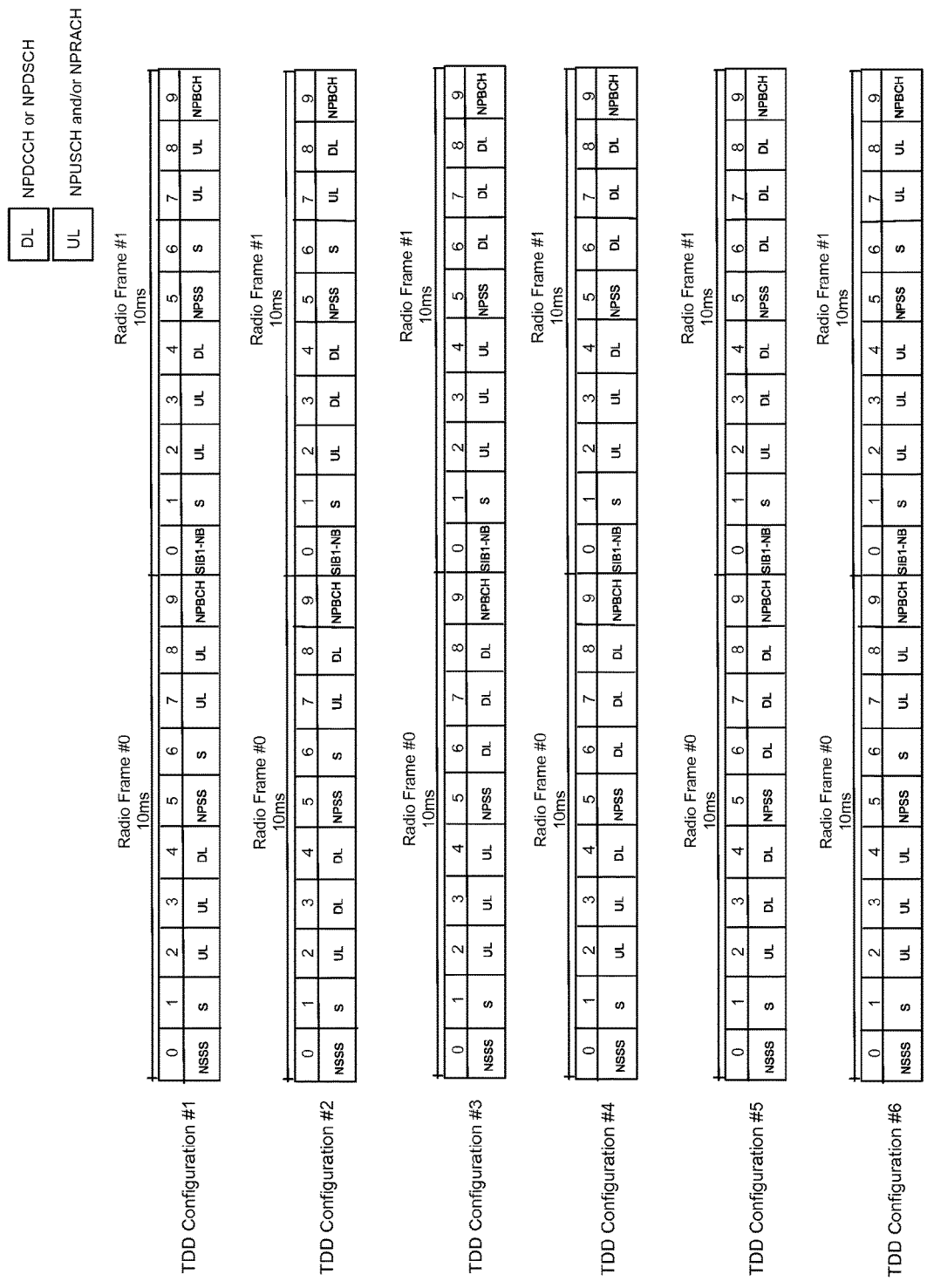
FIG. 4 illustrates resource mapping for a TDD configuration on anchor carrier based on certain agreements.

For the anchor carrier, to mitigate inter-cell interference, SIB1-NB can be configured in a subframe other than #0 in odd frames in some embodiments. Considering only TDD configuration #1 and #2 are currently deployed in practice (the TDD configurations are shown on FIG. 3), the natural choice for the SIB1-NB candidate is subframe #4 when MBFSN is not used in the network. However, other subframes can also be used. Subframe #4 serves as a non-exclusive example of embodiments. Notice that MBFSN is an optional feature. Therefore, when MBFSN is used, it is up to the network implementation to configure the SIB1-NB transmission. Even if MBSFN is used, rarely all subframes than can potentially be used for MBSFN will be used in some embodiments.

Certainly, more bits can be used to indicate more candidates for SIB1-NB in some embodiments, but this may be at a cost of overhead in MIB-NB, which can be difficult to justify. However, in the current NB-IoT FDD design, there are several reserved values in the table indicating the number of repetitions for SIB1-NB. These reserved values can be used to indicate which subframe is used for SIB1-NB transmission. Therefore, there is no extra signaling overhead. An example is given in Table 2 below.

As can be seen from the example, extra bits in the MIB were not required to indicate whether subframe #4 is used for SIB1-NB transmission or not. The table can also be extended to the non-anchor case, which is discussed in detail in later paragraphs.

TABLE 2

Example of subframe configuration and number of repetitions for SIB1-NB in TDD.

| Value of schedulingInfoSIB1 | Number of NPDSCH repetitions and subframe |
| --- | --- |
| 0 | 4 |
| 1 | 8 |
| 2 | 16, subframe #0, both anchor and non-anchor |
| 12 | 16, subframe #4 if anchor, subframe #0 and #5 if non-anchor |
| 3 | 4 |
| 4 | 8 |
| 5 | 16, subframe #0 both anchor and non-anchor |
| 13 | 16, subframe #4 if anchor, subframe #0 and #5 if non-anchor |
| 6 | 4 |
| 7 | 8 |
| 8 | 16, subframe #0, both anchor and non anchor |
| 14 | 16, subframe #4 if anchor, subframe #0 and #5 if non-anchor |
| 9 | 4 |
| 10 | 8 |
| 11 | 16, subframe #0, both anchor and non-anchor |
| 15 | 16, subframe #4 if anchor, subframe #0 and #5 if non-anchor |

Notice that in Table 2, there are entries that do not indicate a specific subframe, e.g., row 0, 1, etc. For these rows, the SIB1-NB transmission is the default subframe configured in the cell, e.g., subframe #0 in odd frames on anchor carrier, or some frame(s) on the non-anchor carrier. This is the same for the examples in later paragraphs.

When SIB1-NB is transmitted, by, for example, the network node 16, on the non-anchor carrier only, there may be even more freedom to choose the location of the subframe(s). However, it is preferred in some embodiments to not use additional bits to signal this, as the number of bits in MIB-NB is very limited. Given the MBFSN configurations in TDD, the choices for SIB1-NB on non-anchor carriers are subframe #0 and subframe #5. As can be seen from the example shown in Table 2, extra bits may not be needed to indicate whether only subframe #0 or both subframe #0 and subframe #5 are used when SIB1-NB is transmitted on the non-anchor carrier in some embodiments.

The assumption that can be made here in these embodiments is that whether SIB1-NB is transmitted on the non-anchor carrier is indicated in MIB in a dedicated field. Hence, it is very straightforward for the wireless device 22 to interpret the meaning of e.g., Table 2 based on this indication. It should be understood that Table 2 here is a non-exclusive example of one embodiment of the present disclosure. There can be other ways to use the reserved bits to indicate the extra scheduling information about the SIB1-NB transmission for both anchor and non-anchor carriers.

Further, in embodiments in which the SIB1-NB transmission on the non-anchor carrier is not explicitly indicated in MIB in a dedicated field, the above table can also be optimized to indicate whether the SIB1-NB is transmitted in the anchor or non-anchor carrier, without having to be explicitly indicated in separate MIB bits. An example is provided herein below. For example, in the below table (Table 3) for repetition 16, it is indicated whether the carrier is anchor or non-anchor. For other repetition cases, it may be assumed that the carrier is an anchor.

TABLE 3

Example of subframe configuration and number of repetitions for SIB1-NB in TDD.

| Value of schedulingInfoSIB1 | Number of NPDSCH repetitions and subframe |
| --- | --- |
| 0 | 4 |
| 1 | 8 |
| 2 | 16, subframe #0, anchor |
| 12 | 16 subframe #0 and #5 non-anchor |
| 3 | 4 |
| 4 | 8 |
| 5 | 16, subframe #0, anchor |
| 13 | 16, subframe #0 and #5 non-anchor |
| 6 | 4 |
| 7 | 8 |
| 8 | 16, subframe #0, anchor |
| 14 | 16, subframe #0 and #5 non-anchor |
| 9 | 4 |
| 10 | 8 |
| 11 | 16, subframe #0, anchor |
| 15 | 16, subframe #0 and #5 non-anchor |

Another example to preserve bits so as to use few reserve bits is to use only one Transport Block Size (TBS) for non-anchor repetition when the repetition number is 16. In the below table (Table 4), only scheduling info 12 has been used/extended and others (13 to 15) are still reserved. The new field, 12, indicates that non-anchor carrier with subframes 0 and 5 are used while the repetition is 16. For, other cases, it is considered that anchor carrier will be used.

TABLE 4

Example of subframe configuration and number of repetitions for SIB1-NB in TDD.

| Value of schedulingInfoSIB1 | Number of NPDSCH repetitions |
| --- | --- |
| 0 | 4 |
| 1 | 8 |
| 2 | 16 |
| 3 | 4 |
| 4 | 8 |
| 5 | 16 |
| 6 | 4 |
| 7 | 8 |
| 8 | 16 |
| 9 | 4 |
| 10 | 8 |
| 11 | 16 |
| 12 | 16, subframe #0 and #5 non-anchor |
| 13-15 | Reserved |

Note that using the reserved values of the above table may also necessitate specifying the TBS values for entries 13-15 above, since according to 3GPP TS 36.213:

set $I_{TBS}$ to the value of the parameter schedulingInfoSIB1 configured by higher-layers Therefore, in one example, new TBSs could be provided as follows, where index 12, 13, 14 and 15 indicates the corresponding TBS that is used for the SIB1-NB transmission.

Table 5: Transport block size (TBS) table for NPDSCH carrying SystemInformationBlockType1-NB showing new TBSs for index 12-15 according to embodiments of the present disclosure.

| $I_{TBS}$ | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| TBS | 208 | 208 | 208 | 328 | 328 | 328 | 440 | 440 | 440 | 680 | 680 | 680 | 208 | 328 | 440 | 680 |

Yet another embodiment may rely on the fact that, after the decoding of NPSS/NSSS and MIB-NB, it will be known to the wireless device 22 if the cell is a TDD cell. Therefore, schedulingInfoSIB1 in MIB-NB can in some embodiments point to, or otherwise indicate, a new TDD-specific table. An example is given below in Table 6:

TABLE 6

Example of a TDD-specific table.

| Value of schedulingInfoSIB1 | Number of NPDSCH repetitions |
|---|---|
| 0 | 8 |
| 1 | 16, subframe #0, both anchor and non-anchor |
| 2 | 16, subframe #4 if anchor, subframe #0 and #5 if non-anchor |
| 3 | 8 |
| 4 | 16, subframe #0, both anchor and non-anchor |
| 5 | 16, subframe #4 if anchor, subframe #0 and #5 if non-anchor |
| 6 | 8 |
| 7 | 16, subframe #0, both anchor and non-anchor |
| 8 | 16, subframe #4 if anchor, subframe #0 and #5 if non-anchor |
| 9 | 8 |
| 10 | 16, subframe #0, both anchor and non-anchor |
| 11 | 16, subframe #4 if anchor, subframe #0 and #5 if non-anchor |
| 12-15 | Reserved |

In yet another embodiment, the table could even include the indication of whether SIB1-NB is transmitted on a non-anchor or an anchor carrier. That is, different entries/rows may be used for anchor and non-anchor, respectively.

In yet another embodiment, the current number of repetitions for SIB1-NB table for FDD may be reused for TDD. Assuming MIB-NB includes a field to indicate whether SIB1-NB is on anchor or none anchor, a new SIB1-NB subframe mapping table, e.g., Table 7, may be introduced to define the SIB1-NB subframe mapping for SIB1-NB on anchor and non-anchor carrier.

TABLE 7

Example of subframe mapping for SIB1-NB on anchor carrier in TDD

| Number of NPDSCH repetitions | Subframe mapping (anchor) | Subframe mapping (non-anchor) |
|---|---|---|
| 4 | 0 | 0 |
| 8 | 0 | 0 |
| 16 | 4(*) | 0 |

Note
(*)only applicable when MBSFN is not used.

In yet another embodiment, two separate tables (e.g., Tables 8 and 9 below) may be used for scheduling, one for non-anchor and one for anchor SIB1-NB.

TABLE 8

Exemplary Number of repetitions for SIB1-NB on anchor carrier in TDD

| Value of schedulingInfoSIB1 | Number of NPDSCH repetitions |
|---|---|
| 0 | 4 |
| 1 | 8 |
| 2 | 16 |
| 3 | 4 |
| 4 | 8 |
| 5 | 16 |
| 6 | 4 |
| 7 | 8 |
| 8 | 16 |
| 9 | 4 |
| 10 | 8 |
| 11 | 16 |
| 12-15 | Reserved |

TABLE 9

Exemplary Number of repetitions for non-anchor SIB1-NB in TDD

| Value of schedulingInfoSIB1 | Number of NPDSCH repetitions and subframe |
|---|---|
| 0 | 4, subframe #0 |
| 1 | 8, subframe #0 |
| 2 | 8, subframe #5 |
| 3 | 16, subframe #0 |
| 4 | 16, subframe #5 |
| 5 | 4, subframe #0 |
| 6 | 8, subframe #0 |
| 7 | 8, subframe #5 |
| 8 | 16, subframe #0 |
| 9 | 16, subframe #5 |
| 10 | 4 subframe #0 |
| 11 | 8, subframe #0 |
| 12 | 8, subframe #5 |
| 13 | 16, subframe #0 |
| 14 | 16, subframe #5 |
| 15 | reserved |

Note that the table could look quite different if also the TBS table is redefined for TDD, which is also a possible alternative embodiment.

In one of the embodiments, it is claimed that the entries in the schedulingInfoSIB1 can be also used to indicate the non-anchor Physical Resource Block (PRB) where SIB1-NB will be transmitted. For example, from above scheduling table, if value 13 is present, it would mean the non-anchor PRB is the first PRB on the left of anchor-PRB. Similarly, value 14 would imply that non-anchor PRB is the first PRB on the right of anchor-PRB.

In yet other embodiments, other configurations for indicating SIB1-NB scheduling information for anchor and non-anchor carriers can be provided.

Some additional embodiments may include one or more of the following:

Embodiment A1. A network node configured to communicate with a wireless device (wireless device), the network node configured to, and/or comprising a radio interface and/or comprising processing circuitry configured to communicate a Master Information Block (MIB) that includes scheduling information indicating at least one of a subcarrier for System Information Block Type 1-Narrow Band (SIB1-NB) transmissions and a number of repetitions of SIB1-NB transmissions for Narrow Band-Internet of Things (NB-IoT) Time Division Duplex (TDD).

Embodiment A2. The network node according to Embodiment A1, wherein the scheduling information is included in at least a portion of a table indicating the number of repetitions for SIB1-NB.

Embodiment A3. The network node according to Embodiment A2, wherein the at least the portion of the table is associated with at least one reserve value field corresponding to at least one of values 12-15 of SIB1 scheduling information values of the table.

Embodiment A4. The network node according to any of Embodiments A1-A3, wherein the scheduling information indicates which subframe is used for the SIB1-NB.

Embodiment A5. The network node according to any of Embodiments A1-A4, wherein the scheduling information indicates at least one subframe for SIB1-NB on an anchor carrier and at least one subframe for SIB1-NB on a non-anchor carrier.

Embodiment A6. The network node according to any Embodiments A1-A5, wherein the scheduling information indicates whether the at least one carrier is an anchor carrier or a non-anchor carrier.

Embodiment A7. The network node according to any of Embodiments A1-A6, wherein the scheduling information indicates a TDD-specific table.

Embodiment A8. The network node according to any of Embodiments A1-A7, wherein the scheduling information indicates at least one SIB1-NB subframe mapping table defining at least one SIB1-NB subframe mapping for SIB1-NB on at least one of the anchor and the non-anchor carriers.

Embodiment B1. A communication system including a host computer, the host computer comprising:
processing circuitry configured to provide user data; and
a communication interface configured to forward the user data to a cellular network for transmission to a wireless device (wireless device),
the cellular network comprising a network node having a radio interface and processing circuitry, the network node configured to, and/or the network node's processing circuitry configured to communicate a Master Information Block (MIB) that includes scheduling information indicating at least one of a subcarrier for System Information Block Type 1-Narrow Band (SIB1-NB) transmissions and a number of repetitions of SIB1-NB transmissions for Narrow Band-Internet of Things (NB-IoT) Time Division Duplex (TDD).

Embodiment B2. The communication system of Embodiment B1, further including the network node.

Embodiment B3. The communication system of Embodiment B2, further including the wireless device, wherein the wireless device is configured to communicate with the network node.

Embodiment B4. The communication system of Embodiment B3, wherein:
the processing circuitry of the host computer is configured to execute a host application, thereby providing the user data; and
the wireless device comprises processing circuitry configured to execute a client application associated with the host application.

Embodiment C1. A method implemented in a network node, the method comprising communicating a Master Information Block (MIB) that includes scheduling information indicating at least one of a subcarrier for System Information Block Type 1-Narrow Band (SIB1-NB) transmissions and a number of repetitions of SIB1-NB transmissions for Narrow Band-Internet of Things (NB-IoT) Time Division Duplex (TDD).

Embodiment C2. The method according to Embodiment C1, wherein the scheduling information is included in at least a portion of a table indicating the number of repetitions for SIB1-NB.

Embodiment C3. The method according to Embodiment C2, wherein the at least the portion of the table is associated with at least one reserve value field corresponding to at least one of values 12-15 of SIB1 scheduling information values of the table.

Embodiment C4. The method according to any of Embodiments C1-C3, wherein the scheduling information indicates which subframe is used for the SIB1-NB.

Embodiment C5. The method according to any of Embodiments C1-C4, wherein the scheduling information indicates at least one subframe for SIB1-NB on an anchor carrier and at least one subframe for SIB1-NB on a non-anchor carrier.

Embodiment C6. The method according to any Embodiments C1-05, wherein the scheduling information indicates whether the at least one carrier is an anchor carrier or a non-anchor carrier.

Embodiment C7. The method according to any of Embodiments C1-C6, wherein the scheduling information indicates a TDD-specific table.

Embodiment C8. The method according to any of Embodiments C1-C7, wherein the scheduling information indicates at least one SIB1-NB subframe mapping table defining at least one SIB1-NB subframe mapping for SIB1-NB on at least one of the anchor and the non-anchor carriers.

Embodiment D1. A method implemented in a communication system including a host computer, a network node and a wireless device (wireless device), the method comprising:
at the host computer, providing user data; and
at the host computer, initiating a transmission carrying the user data to the wireless device via a cellular network comprising the network node, wherein the network node communicates a Master Information Block (MIB) that includes scheduling information indicating at least one of a subcarrier for System Information Block Type 1-Narrow Band (SIB1-NB) transmissions and a number of repetitions of SIB1-NB transmissions for Narrow Band-Internet of Things (NB-IoT) Time Division Duplex (TDD).

Embodiment D2. The method of Embodiment D1, further comprising, at the network node, transmitting the user data.

Embodiment D3. The method of Embodiment D2, wherein the user data is provided at the host computer by executing a host application, the method further comprising, at the wireless device, executing a client application associated with the host application.

Embodiment E1. A wireless device (wireless device) configured to communicate with a network node, the wireless device configured to, and/or comprising a radio interface and/or processing circuitry configured to:
 receive a Master Information Block (MIB) that includes scheduling information; and
 based on at least the scheduling information, determine at least one of a subcarrier for System Information Block Type 1-Narrow Band (SIB1-NB) transmissions and a number of repetitions of SIB1-NB transmissions in Narrow Band-Internet of Things (NB-IoT) Time Division Duplex (TDD).

Embodiment E2. The wireless device according to Embodiment E1, wherein the scheduling information is included in at least a portion of a table indicating the number of repetitions for SIB1-NB.

Embodiment E3. The wireless device according to Embodiment E2, wherein the at least the portion of the table is associated with at least one reserve value field corresponding to at least one of values 12-15 of SIB1 scheduling information values of the table.

Embodiment E4. The wireless device according to any of Embodiments E1-E3, wherein the scheduling information indicates which subframe is used for the SIB1-NB.

Embodiment E5. The wireless device according to any of Embodiments E1-E4, wherein the scheduling information indicates at least one subframe for SIB1-NB on an anchor carrier and at least one subframe for SIB1-NB on a non-anchor carrier.

Embodiment E6. The wireless device according to any Embodiments E1-E5, wherein the scheduling information indicates whether the at least one carrier is an anchor carrier or a non-anchor carrier.

Embodiment E7. The wireless device according to any of Embodiments E1-E6, wherein the scheduling information indicates a TDD-specific table.

Embodiment E8. The wireless device according to any of Embodiments E1-E7, wherein the scheduling information indicates at least one SIB1-NB subframe mapping table defining at least one SIB1-NB subframe mapping for SIB1-NB on at least one of the anchor and the non-anchor carriers.

Embodiment F1. A communication system including a host computer, the host computer comprising:
 processing circuitry configured to provide user data; and
 a communication interface configured to forward user data to a cellular network for transmission to a wireless device (wireless device),
 the wireless device configured to, and/or comprising a radio interface and/or processing circuitry configured to:
  receive a Master Information Block (MIB) that includes scheduling information; and
  based on at least the scheduling information, determine at least one of a subcarrier for System Information Block Type 1-Narrow Band (SIB1-NB) transmissions and a number of repetitions of SIB1-NB transmissions in Narrow Band-Internet of Things (NB-IoT) Time Division Duplex (TDD).

Embodiment F2. The communication system of Embodiment F1, further including the wireless device.

Embodiment F3. The communication system of Embodiment F2, wherein the cellular network further includes a network node configured to communicate with the wireless device.

Embodiment F4. The communication system of Embodiment F2 or F3, wherein:
 the processing circuitry of the host computer is configured to execute a host application, thereby providing the user data; and
 the wireless device's processing circuitry is configured to execute a client application associated with the host application.

Embodiment G1. A method implemented in a wireless device (wireless device), the method comprising:
 receiving a Master Information Block (MIB) that includes scheduling information; and
 based on at least the scheduling information, determining at least one of a subcarrier for System Information Block Type 1-Narrow Band (SIB1-NB) transmissions and a number of repetitions of SIB1-NB transmissions in Narrow Band-Internet of Things (NB-IoT) Time Division Duplex (TDD).

Embodiment G2. The method according to Embodiment G1, wherein the scheduling information is included in at least a portion of a table indicating the number of repetitions for SIB1-NB.

Embodiment G3. The method according to Embodiment G2, wherein the at least the portion of the table is associated with at least one reserve value field corresponding to at least one of values 12-15 of SIB1 scheduling information values of the table.

Embodiment G4. The method according to any of Embodiments G1-G3, wherein the scheduling information indicates which subframe is used for the SIB1-NB.

Embodiment G5. The method according to any of Embodiments G1-G4, wherein the scheduling information indicates at least one subframe for SIB1-NB on an anchor carrier and at least one subframe for SIB1-NB on a non-anchor carrier.

Embodiment G6. The method according to any Embodiments G1-G5, wherein the scheduling information indicates whether the at least one carrier is an anchor carrier or a non-anchor carrier.

Embodiment G7. The method according to any of Embodiments G1-G6, wherein the scheduling information indicates a TDD-specific table.

Embodiment G8. The method according to any of Embodiments G1-G7, wherein the scheduling information indicates at least one SIB1-NB subframe mapping table defining at least one SIB1-NB subframe mapping for SIB1-NB on at least one of the anchor and the non-anchor carriers.

Embodiment H1. A method implemented in a communication system including a host computer, a network node and a wireless device (wireless device), the method comprising:
  at the host computer, providing user data; and
  at the host computer, initiating a transmission carrying the user data to the wireless device via a cellular network comprising the network node, wherein the wireless device is configured to:
    receive a Master Information Block (MIB) that includes scheduling information; and
    based on at least the scheduling information, determine at least one of a subcarrier for System Information Block Type 1-Narrow Band (SIB1-NB) transmissions and a number of repetitions of SIB1-NB transmissions in Narrow Band-Internet of Things (NB-IoT) Time Division Duplex (TDD).

Embodiment H2. The method of Embodiment H1, further comprising, at the wireless device, receiving the user data from the network node.

Embodiment I1. A network node, comprising:
  a memory module configured to store scheduling information; and
  a scheduling module configured to communicate a Master Information Block (MIB) that includes scheduling information indicating at least one of a subcarrier for System Information Block Type 1-Narrow Band (SIB1-NB) transmissions and a number of repetitions of SIB1-NB transmissions for Narrow Band-Internet of Things (NB-IoT) Time Division Duplex (TDD).

Embodiment I2. A wireless device, comprising:
  a memory module configured to store scheduling information; and
  a determination module configured to, based on at least the scheduling information, determine at least one of a subcarrier for System Information Block Type 1-Narrow Band (SIB1-NB) transmissions and a number of repetitions of SIB1-NB transmissions in Narrow Band-Internet of Things (NB-IoT) Time Division Duplex (TDD).

Some additional embodiments may be explained by the following:

BACKGROUND

In a TDD system, unlike the FDD system, the UL and DL are sharing the same carrier frequency. Table 10 shows the available LTE TDD configurations as described by the LTE standard.

As can be seen from Table 10 there are seven different TDD configurations that are supported in the current LTE system, three of them (i.e., configuration #3, #4, and #5) have a Downlink-to-Uplink switching periodicity equal to 10 ms, meaning that there is only one "special subframe" per every radio frame. While, all the other TDD configurations (i.e., configuration #0, #1, #2, and #6) use a Downlink-to-Uplink switching periodicity equal to 5 ms, where there are two "special subframes" per every radio frame. The "special subframes" consists of three fields, Downlink Pilot Time Slot (DwPTS), Guard Period (GP), and Uplink Pilot Time Slot (UpPTS), which have variable lengths depending on the special subframe configuration. Due to UL timing advance (TA), the "special subframes" is inserted between DL subframe and UL subframe to offer the UE preparing time to switch between DL to UL.

TABLE 10

| Uplink-downlink configurations | | | | | | | | | | | | | | |
|---|---|---|---|---|---|---|---|---|---|---|---|---|---|---|
| Uplink-downlink configuration | Downlink-to-Uplink Switch-point periodicity | Subframe number | | | | | | | | | Number of subframes/frame | | | |
| | | 0 | 1 | 2 | 3 | 4 | 5 | 6 | 7 | 8 | 9 | DL | UL | S |
| ~~0~~ | ~~5 ms~~ | ~~D~~ | ~~U~~ | ~~S~~ | ~~S~~ | ~~S~~ | ~~D~~ | ~~U~~ | ~~S~~ | ~~S~~ | ~~S~~ | ~~2~~ | ~~6~~ | ~~2~~ |
| 1 | 5 ms | D | S | U | U | D | D | S | U | U | D | 4 | 4 | 2 |
| 2 | 5 ms | D | S | U | D | D | D | S | U | D | D | 6 | 2 | 2 |
| 3 | 10 ms | D | S | U | U | U | D | D | D | D | D | 6 | 3 | 1 |
| 4 | 10 ms | D | S | U | U | D | D | D | D | D | D | 7 | 2 | 1 |
| 5 | 10 ms | D | S | U | D | D | D | D | D | D | D | 8 | 1 | 1 |
| 6 | 5 ms | D | S | U | U | U | D | S | U | U | D | 3 | 5 | 2 |

D: Downlink;
U: Uplink;
S: Special Subframe

In LS reply from RAN4, it states that

"Considering NB-IoT UEs should be low complexity, RAN4 further discussed the minimum time for DL-to-UL and UL-to-DL switching on one NB-IoT carrier for TDD NB-IoT UEs and evaluated it to be equal to 20 μs for both direction."

Notice that in LTE, the useful symbol time is ~66.7 μs. For normal mode, the first symbol in a slot has a cyclic prefix (CP) of ~5.2 μs and the remaining six symbols have a CP of ~4.7 μs. Given the reply from RAN4, the DL-to-UL and UL-to-DL switching time is within one OFDM symbol. This implies all the LTE special subframe configurations can be supported in NB-IoT (notice that for the in-band case, the first OFDM symbol will anyway not be used due to the legacy LTE control region). A discussion of how to use the special subframes are provided in a companion contribution.

Proposal 1: Confirm Working Assumption that "TDD NB-IoT Will Support all LTE Special Subframe Configurations".

TDD Support into NB-IoT for Downlink

In this section, the general configuration aspects of NB-IoT support are discussed. Then, either of the DL channels individually are discussed in the context of TDD.

TDD Configurations

In the discussion of RAN1 #90, regarding the support of TDD configurations, the following agreements are made:

MCL target of 164 dB at an 'application layer' data rate of 160 bps is targeted for at least one UL:DL configuration (FFS which one or more than one).

NOTE: The at least one UL:DL configuration may or may not be different for UL MCL target than DL MCL target.

From the agreements, it can be inferred that the NB-IoT TDD design does not necessary requires to support all the existing UL:DL configurations. In the discussion of RAN1 #90bis, regarding the support of TDD configurations, the following agreement and working assumption were made:

Agreement

TDD UL:DL configuration 0 is not supported in TDD NB-IoT in Rel-15 Working assumption TDD UL:DL configuration 6 is not supported in TDD NB-IoT in Rel-15.

Certainly, to achieve best co-existence between NB-IoT TDD and the existing TDD network, it is preferable that NB-IoT TDD can support as many existing LTE TDD configurations as possible. As pointed out during the RAN1 #90bis discussions, for some configurations, due to the limited number of available DL and/or UL subframes in a radio frame, there may not be an efficient NB-IoT TDD design for these configurations. Therefore, TDD configuration #0 is not supported in NB-IoT TDD. Regarding TDD configuration #6, from the DL perspective, the DL resource of TDD configuration is still very limited, i.e., there are only 3 DL subframes in configuration #6. If TDD configuration #6 is supported, considering the SI scheduling, it is necessary to consider to setup more default carriers for TDD configuration #6, and the placement of SI and paging subframes are further limited by supporting TDD configuration #6.

In RAN1 #90bis, one argument for supporting TDD configuration #6 was that it has a substantial number of UL subframes, which is beneficial for IoT systems that are UL heavy. However, this is not a valid argument. This is because the UL traffic needs to be supported by DL scheduling, even for the case of semi-persistent scheduling (SPS). If there are not enough DL subframes, the UL resources cannot be utilized efficiently. For the case of SPS, first, it is not certain whether SPS will be supported in TDD due to limited DL and/or UL resource, secondly, even SPS is supported, the UE still needs to monitor the DL for the SPS configuration, activation, deactivation, reconfiguration. Therefore, even if SPS is supported, TDD configuration #6 would put more constraints on the SPS design, which may not be beneficial for the widely-used TDD configurations.

Moreover, in terms of uplink the TDD configuration #6 also imposes some complications because it counts with an asymmetrical number of UL subframes in each half of a radio frame, which may for NPRACH require either using two different NPRACH formats within a radio frame, or in some cases adding rules for using one NPRACH format at a time within a radio frame. Based on the difficulties that the TDD configuration #6 implies for both, UL and DL. Therefore, it is proposed to confirm the working assumption that Proposal 2: TDD UL:DL Configuration 6 is not Supported in TDD NB-IoT in Rel-15.

SIB1-NB Transmission

During RAN1 #90bis, it was agreed that:
It is supported that SIB1-NB is transmitted only on the anchor carrier
In at least subframe #0 in odd frames
It is supported that SIB1-NB can be transmitted on non-anchor carrier,
FFS details
It is necessary to consider SFN wraparound as part of FFS
Periodicity of SIB1-NB in TDD is the same as FDD (i.e. 2560 ms)
One transport block of SIB1-NB is transmitted over 8 SIB1-NB subframes (i.e. same as FDD).
During RAN 1 #91, it was agreed that:
It is not supported that SIB1-NB is transmitted on both anchor and non-anchor carrier.
At least for 16 repetitions for SIB1-NB transmission,
Whether SIB1-NB transmitted on anchor carrier or non-anchor one is indicated by MIB-NB.
When SIB1-NB is transmitted on non-anchor carrier, at least subframe #0 is used.
FFS: SIB1-NB can be transmitted on anchor carrier other than subframe #0
FFS: The frequency position of non-anchor carrier is indicated by [0, 1, or 2] bits in MIB-NB for in-band scenario.
FFS: case for guard-band and stand-alone scenarios
FFS: Cases for 4 and 8 repetitions.
Currently in NB-IoT TDD, it is agreed that:
NPSS is transmitted on subframe #5 in every radio frame
NSSS is transmitted on subframe #0 in every even-numbered radio frame
NPBCH is in subframe 9 in every radio frame on the same carrier as NPSS/NSSS.

SIB1-NB Transmission Configurations on Non-Anchor Carrier

When SIB1-NB is transmitted on anchor carrier only, at least subframe #0 in odd frames is used. As discussed above, this works fine for most of the cases, and only have potential problem if the number of repetitions is configured to be 16. Notice that 16 repetitions are only used when the cell targets to support the maximum coverage. Then, one solution is to reduce the size of SIB1-NB to improve the coverage, if the concern is that there might not be sufficient downlink subframes available on a NB-IoT TDD anchor carrier for SIB1-NB transmission (e.g., to avoid interference from neighboring cells) especially if the number of repetitions is configured to be 16. Notice that the most important information in SIB1-NB is the scheduling information of other SIBs, cell access info and hyperSFN bits. A smaller SIB1-NB message, which requires fewer repetitions to achieve the same coverage enhancement level, can facilitate the SIB1-NB scheduling and transmission on anchor carrier.

Proposal 3: Send LS to RAN2 to Consult the Feasibility of Reducing the Size of SIB1-NB.

To mitigate inter-cell interference, SIB1-NB can be configured in another subframe other than #0 in odd frames. Considering only TDD configuration #1 and #2 are currently deployed in practice, the natural choice for the SIB1-NB candidate is subframe #4 when MBFSN is not used in the network. Notice that MBFSN is an optional feature. Therefore, when MBFSN is used, it is up to the network implementation to configure the SIB1-NB transmission.

Proposal 4: When SIB1-NB is Transmitted Only on the Anchor Carrier, the Network can Configure SIB1-NB to be Transmitted Either in Subframe #0 or #4 in Odd Frames.

Certainly, we can use more bits to indicate more candidates for SIB1-NB, but this is at a cost of overhead in MIB-NB, which is difficult to justify. However, we notice that in the current NB-IoT FDD design, there are several reserved values in the table indicating the number of repetitions for SIB1-NB. These reserved values can be used to indicate which subframe is used for SIB1-NB transmission. Therefore, there is no extra signaling overhead. An example is given in Table 11.

As we can see from the example, we do not need to introduce extra bits in the MIB to indicate whether subframe #4 is used for SIB1-NB transmission or not. The table can also be extended to the non-anchor case, which we discuss in detail in later paragraphs.

TABLE 11

Example of subframe configuration and number of repetitions for SIB1-NB in TDD

| Value of schedulingInfoSIB1 | Number of NPDSCH repetitions and subframe |
|---|---|
| 0 | 4 |
| 1 | 8 |
| 2 | 16, subframe #0, both for anchor and non-anchor |
| 12 | 16, subframe #4 if anchor, subframe #0 and #5 if non-anchor |
| 3 | 4 |
| 4 | 8 |
| 5 | 16, subframe #0, both for anchor and non-anchor |
| 13 | 16, subframe #4 if anchor, subframe #0 and #5 if non-anchor |
| 6 | 4 |
| 7 | 8 |
| 8 | 16, subframe #0, both for anchor and non-anchor |
| 14 | 16, subframe #4 if anchor, subframe #0 and #5 if non-anchor |
| 9 | 4 |
| 10 | 8 |
| 11 | 16, subframe #0, both for anchor and non-anchor |
| 15 | 16, subframe #4 if anchor, subframe #0 and #5 if non-anchor |

When SIB1-NB is transmitted on non-anchor carrier only, there are more freedom to choose the location of the subframe(s). However, it is preferred to not use additional bits to signal this, as the number of bits in MIB-NB is very limited. Given the MBFSN configurations in TDD, the choices for SIB1-NB on non-anchor carriers are subframe #0 and subframe #5. As we can see from Table 11, we do not need extra bits to indicate whether only subframe #0 or both subframe #0 and subframe #5 are used when SIB1-NB is transmitted on the non-anchor carrier. Therefore, it is proposed that:

Proposal 5: When SIB1-NB is Transmitted Only on a Non-Anchor Carrier, SIB1-NB Subframe can be Either Subframe #0, or Both Subframe #0 and Subframe #5 in Odd Frames.

During the in RAN1 #91, it was discussed whether only to transmit SIB1-NB with 16 reps on the non-anchor carrier. The reasoning was that SIB1-NB only needs to be transmitted on the non-anchor carrier if there is not enough resource on the anchor carrier to transmit SIB1-NB. However, this is not the case in practice. First, the anchor carrier in some cases can have better coverage than the non-anchor carrier, therefore, it may be beneficial to have more resource for the data channel on the anchor carrier, especially if the UE indicate in the msg3 that the cause of the connection is an alarm. It is preferred to address these UEs as quick as possible. Therefore, if SIB1-NB can be sent on the non-anchor carrier, more resource on the anchor carrier can be utilized for data channel. Remember that a UE only needs to reacquire SI if there is a change in the SI, but it needs to monitor the anchor for all kinds of mobility related measurements. Secondly, to have the flexibility of supporting different number of repetitions of SIB1-NB transmission on the non-anchor carrier does not require more bits in the MIB (see Table 11). Therefore, we have the following observation and proposal Observation 1: Supporting Different Number of Repetitions of SIB1-NB Transmission on the Non-Anchor Carrier can Offer Better Utilization of the DL Resource in the System.

Observation 2: Supporting Different Number of Repetitions of SIB1-NB Transmission on the Non-Anchor does not Require More Bits to be Introduced in the MIB.

Proposal 6: When SIB1-NB is Transmitted Only on a Non-Anchor Carrier, 4, 8 and 16 Repetitions should be Supported.

SIB1-NB Non-Anchor Position

As discussed in RAN1 #90bis, if SIB1-NB is transmitted on the non-anchor carrier, it is not possible to signal the exact position of the non-anchor carrier by the means of using E-UTRA Absolute Radio Frequency Channel Number (EARFCN) due to the limited number of bits in MIB-NB. Therefore, one possible way of signalling the SIB1-NB carrier position is to predefine it with respects to the anchor carrier. In the next paragraphs, the problems and possible solutions are discussed in detail for all three deployment modes.

For the inband deployment, which is most important for NB-IoT TDD, in the sourcing company's opinion, when a predefined non-anchor carrier is used for SIB1-NB, it should not fragment the Resource Block Group (RBG) in the legacy LTE. In legacy LTE resource allocation Type 0, which is the most commonly used resource allocation type, the physical resource blocks (PRBs) are grouped into RBG to be scheduled to a UE. Depending on the system bandwidth, the number of PRBs in each group varies from 1 to 4. By predefining the position of the non-anchor carrier that carries SIB1-NB, the number of bits used in the MIB-NB can be minimized, but for the NB-IoT in-band deployment scenario it can fragment the LTE resource allocation due to the use of RBG. This is because in NB-IoT, narrowband reference signal (NRS) is used as the DL reference signal, which is not known to the legacy LTE UEs. Hence, for the inband operation, it is preferred the anchor carrier and the non-anchor carrier(s) should concentrate in as few RBGs as possible to avoid fragment the LTE DL resource allocation. That is all PRBs of a RBG should be used before another RBG is used, also in RBGs where there are only non-anchor carriers.

Recall that the anchor carrier PRB index in NB-IoT FDD is signaled from the middle to band edge in the MIB-NB. This is to avoid signaling the LTE system bandwidth. In FIG. 16, the problem is illustrated in detail. As can be seen, an anchor carrier (shaded in columns 1, 3 and 5 of the table shown in FIG. 16) can be at either side of one RBG group. Therefore, at least two predefined positions are required with respect to the anchor carrier to do not break the RBG in legacy LTE.

Proposal 7: For Inband Operation, Two Predefined Non-Anchor Carrier Positions, i.e., One at Lower Frequency and One at Higher Frequency, are Required with Respects to Anchor Carrier for SIB1-NB Transmission in NB-IoT TDD to do not Break the RBG in Legacy LTE.

In addition, recall that guardband deployment is not supported for 1.4 MHz and 3 MHz bandwidth, and from 5 MHz and above, the size of the RBG is always larger than 2. Therefore, from a resource usage point of view, there is no benefit to have anchor in the inband but the non-anchor for SIB1-NB transmission in the guardband. Therefore, it is proposed that:

Proposal 8: For Inband Operation, it is not Necessary to have Non-Anchor Carrier for SIB1-NB in the Guardband.

For the guardband operation, NB-IoT carriers are placed in the guard-band area of a LTE band. Due to out-band emission requirement, currently NB-IoT guard-band deployment is only possible for 5, 10, 15 and 20 MHz bandwidth. It is not necessary that NB-IoT carriers are placed on the LTE PRB grid (they need to be placed on the LTE subcarrier grid though, to avoid inter-subcarrier interference). In principle, NB-IoT carriers can be placed on any subcarriers in the guard-band, as long as the 180 kHz NB-IoT band falls entirely into the guard-band. And for anchor carrier, the frequency offset to the 100 Hz channel raster must be +/−2.5 KHz or +/−7.5 KHz, otherwise UE would not be able to find the carrier.

Notice that it is only possible to have one anchor carrier in the guardband of LTE at each side of the band edge, due to the channel raster requirement. However, there is no such limitation for the non-anchor carriers. General speaking, it is beneficial to deploy NB-IoT as close to the LTE carrier as possible, to reduce adjacent channel interference and to simplify implementation for network equipment, etc. For 20 MHz and 10 MHz case, the first PRBs in the guard-band happen to be close to the 100 kHz channel raster enough and hence can be chosen as anchor carrier. For 15 MHz and 5 MHz case, the first PRBs in the guards-band are so much off the channel raster that they cannot be used as anchor carriers. The first possible anchor-carrier PRBs in the guard-band is the third one, counting from the edge of the in-band. To combat this problem, it was discussed in Rel13 NB-FDD design that three empty sub-carriers can be added next to the in-band edge to adjust anchor carrier position in the guard-band by the required channel raster. After the insertion of the 3 empty sub-carriers, the 'shifted' first PRB in the guard-band is 7.5 KHz off to the raster and hence can be used as anchor carrier for NB-IoT.

Based on the above analysis, for NB-IoT TDD guard-band deployment, for 20 MHZ and 10 MHz LTE system bandwidth, anchor carriers can be placed on the first PRB in the guard-band, counting from the edge of the in-band. For 15 MHz and 5 MHz cases, 3 empty subcarriers should be added in-between the in-band PRB grid and the guard-band PRB grid.

Therefore, the predefined SIB1-NB carrier have several possibilities. Either the SIB1-NB non-anchor carrier is at the same band edge as the anchor carrier, or on the other band edge of the system in the mirroring position as the anchor carrier. If latter is the case, the LTE system bandwidth needs to be signaled.

Proposal 9: When SIB1-NB is Transmitted on a Non-Anchor Carrier, from RAN1 Perspective, it is Possible and Beneficial to Support SIB-NB Non-Anchor Carrier to be Transmitted on the Guard-Band, if the Anchor Carrier is Transmitted in the Guard-Band.

Observation 3: The LTE System Bandwidth Needs to be Signaled for if Non-Anchor Carrier is Used for SIB1-NB Transmission in the Guard Band Scenario.

Furthermore, there is also a possibility that the anchor carrier is in the guard-band, and the non-anchor carrier is inband. In this case, if support for SIB1-NB transmission is provided on the inband non-anchor carrier, it may also need to be indicated whether the non-anchor carrier is to the higher or lower frequency of the anchor carrier. Therefore, the same signaling as the inband case can be reused. As discussed above, there is only one anchor position at each band edge in the case of guardband deployment. Therefore, the preferred non-anchor position for SIB1-NB transmission is the closest PRB at the LTE band edge. However, in this case, the operation mode of the non-anchor carrier should also be indicated.

Proposal 10: In the Guardband Operation, the SIB1-NB Transmitted on a Inband Non-Anchor Carrier should be Supported.

For standalone operation, using the NB-IoT FDD MIB-NB as a reference, 5 additional spare bits are available. In standalone deployment case, where there is no coexisting LTE-TDD system, NB-IoT TDD anchor carrier can be deployed on the 100 kHz channel raster in the assigned frequency band. In Rel-13 NB-IoT, non-anchor carriers are required to be deployed on the 100 kHz channel raster in the same frequency band as the anchor carrier, which is basically the deployment principle for NB-IoT FDD. However, if two NB-IoT carriers are deployed in two adjacent 200 kHz channels, the adjacent channel interference becomes a problem, due to that the NB-IoT channels cannot be fit into the same 15 KHz subcarrier grid. For this reason, it is also possible that the non-anchor carriers are not exactly placed on the 100 kHz channel raster for Rel-14 NB-IoT. Instead, they are deployed with a certain frequency offset to the channel raster, to achieve sub-carrier grid alignment with the anchor carrier. Whichever deployment principle is adopted, SIB1-NB non-anchor carriers can always be specified with a relative frequency offset to the anchor carrier. The relative frequency offset can be given in number of 15 kHz subcarriers, or in number of 180 KHz PRBs, or in number of 200 kHz NB-IoT channel bandwidth.

Proposal 11: In Stand-Alone Operation Mode, when SIB1-NB is Transmitted on a Non-Anchor Carrier, from RAN1 Perspective, it is Possible and Beneficial to Support SIB1-NB to be Transmitted Non-Anchor Carrier. The Relative Frequency Offset for the Non-Anchor Carrier to the Anchor Carrier can be Given, e.g., in Number of 15 kHz Subcarriers, 180 kHz/200 kHz PRBs.

MasterInformationBlock-NB

```
-- ASN1START
MasterInformationBlock-NB ::=      SEQUENCE {
    systemFrameNumber-MSB-r13          BIT STRING (SIZE (4)),
    hyperSFN-LSB-r13                   BIT STRING (SIZE (2)),
    schedulingInfoSIB1-r13             INTEGER (0..15),
    systemInfoValueTag-r13             INTEGER (0..31),
```

-continued

```
    ab-Enabled-r13                    BOOLEAN,
    operationModeInfo-r13             CHOICE {
        inband-SamePCI-r13                Inband-SamePCI-NB-r13,
        inband-DifferentPCI-r13           Inband-DifferentPCI-NB-r13,
        guardband-r13                     Guardband-NB-r13,
        standalone-r13                    Standalone-NB-r13
    },
    spare                             BIT STRING (SIZE (11))
}
ChannelRasterOffset-NB-r13 ::= ENUMERATED {khz-7dot5, khz-2dot5,
khz2dot5, khz7dot5}
Guardband-NB-r13 ::=              SEQUENCE {
    rasterOffset-r13                  ChannelRasterOffset-NB-r13,
    spare                             BIT STRING (SIZE (3))
}
Inband-SamePCI-NB-r13 ::=         SEQUENCE {
    eutra-CRS-SequenceInfo-r13        INTEGER (0..31)
}
Inband-DifferentPCI-NB-r13 ::=    SEQUENCE {
    eutra-NumCRS-Ports-r13            ENUMERATED {same, four},
    rasterOffset-r13                  ChannelRasterOffset-NB-r13,
    spare                             BIT STRING (SIZE (2))
}
Standalone-NB-r13 ::=             SEQUENCE {
    spare                             BIT STRING (SIZE (5))
}
-- ASN1STOP
```

DL Physical Channels in TDD Operation

NPDCCH

In this section, the NPDCCH design for NB-IoT TDD is discussed. In our point of view, most of the design concepts in NB-IoT FDD, e.g., aggregation level, different types of search spaces, definition of search space candidates, and etc., can be directly applied in NB-IoT TDD. Therefore, the discussion is generally limited to what needs to be modified or enhanced in NB-IoT TDD design.

In NB-IoT FDD, forward scheduling is used. Due to the low complexity, in Rel13 NB-IoT FDD design, it is agreed that the UE should not do more than 4 blind decoding within 1 ms, and a 4 ms decoding time for the NPDCCH should be guaranteed. Therefore, if two search space are less than 4 ms apart, the UE is not required to monitor the first search space. However, this may not be the case for NB-IoT TDD.

First of all, the DL transmission of NB-IoT is not continuous. Therefore, naturally there are enough processing time offered during the UL SFs. Furthermore, during the discussions of Rel14 NB-IoT, it is understandable that UE with better performance can be expected while keeping the same low cost. Therefore, it may neither necessary to specify an explicit NPDCCH processing time, nor drop an entire search space when collision happens, e.g., caused by postponing. Moreover, if the entire search space is dropped, it may result in long delays, especially in the TDD configurations that have few DL subframes.

Proposal 12: Do not Explicitly Impose the 4 ms NPDCCH Dropping Rule in NB-IoT TDD. That is the UE Only Drops the NPDCCH Candidates in a Search Space that End Before the Starting of the Next NPDCCH Search Space.

In NB-IoT FDD, the locations of the starting subframe of an NPDCCH search space is defined as "a subframe satisfying the condition $(10 n_f + \lfloor n_s/2 \rfloor) \bmod T = \lfloor \alpha_{offset} \cdot T \rfloor$, where $T = R_{max} \cdot G$, $T \geq 4$." This gives an easy way for the UE to calculate the starting position of an NPDCCH search space regardless the DL valid SF configurations and SI scheduling. This should also be adopted for the NB-IoT TDD design. However, the value of $\alpha_{offset}$ may need to be reconsidered. The use of $\alpha_{offset}$ is to offer different starting subframe for different UEs, which offers scheduling flexibility. Currently, the values of the $\alpha_{offset}$ is among the set $\{0, \frac{1}{8}, \frac{1}{4}, \frac{3}{8}\}$. For example, if we have $T=8$, the $\alpha_{offset}$ gives an offset of 0, 1, 2, 3 different SFs among different UEs. In some of the TDD configurations, if we consider the NPDCCH transmission is postponed due to UL SFs, the use of $\alpha_{offset}$ would points to the same starting SF of the NPDCCH, which contradicts the intention of $\alpha_{offset}$. Therefore, it is beneficial to extend the range of $\alpha_{offset}$ in the NB-IoT TDD design.

Proposal 13: Consider Extending the Range of $\alpha_{offset}$ in the NB-IoT TDD Design to Offer More Scheduling Flexibilities.

Similarly, we may also need to consider extending the value rang of G. This is because in the NB-IoT TDD, there are less DL subframes available. The DL transmission will be postponed when there is an UL transmission, which means it takes longer time for the same search space to be transmitted. Therefore, a larger T is necessary to ensure there is no overlapping between two search spaces.

Proposal 14: Consider Extending the Range of G in the NB-IoT TDD Design to Offer More Scheduling Flexibilities.

Currently, in the NB-IoT FDD system, the scheduling delays between NPDCCH are NPDSCH is indicated in the DCI format N1 (see Table 16.4.1-1 in TS36.213). The scheduling delay values are based on Rmax of the search space, and the maximum scheduling delay is 1024 SFs. Given in a TDD system, the DL and UL SFs are interlaced, the scheduling delay values may need to be redefined.

Observation 4: Due to the Interlaced DL and UL SFs in NB-IoT TDD, the Scheduling Delay Values in DCI N1 May Need to be Redefined.

NRS

In NB-IoT FDD, NRS is used for the UEs to estimate the DL channel for decoding NPBCH, NPDCCH, and NPDSCH. Currently, two NRS antenna ports are supported. For NB-IoT TDD, since DL subframes are interleaved with UL subframes, it may be challenging to performance cross subframe channel estimation in the same way as in the FDD setup. Therefore, other ways may be considered to compensate the loss.

One way to compensate this is to introduce more TX antennas at the eNB to increase the diversity gain. At this moment, in NB-IoT FDD, only NRS patterns for 2 TX antenna ports are supported. We can consider extending this to 4 TX antenna ports, e.g., similar to the legacy LTE, to support SFBC for 4 antennas.

Proposal 15: Consider Supporting NRS Patterns for 4 Antenna Ports for NB-IoT TDD.

OTDOA Support for TDD NB-IoT

In the updated WID, the supported of OTDOA is agreed to be introduced in NB-IoT TDD. However, since the DL design of NB-IoT TDD has some significant differences compared to the NB-IoT FDD design, not all the principles of NPRS configuration in NB-IoT FDD can be directly applied.

In normal DL subframes, the NPRS generation can be the same as NB-IoT FDD. If 4 TX antenna ports are supported by NB-IoT TDD, if necessary, a new NPRS pattern may need to be defined.

Proposal 16: In Normal DL Subframes, the NPRS Generation can be the Same as NB-IoT FDD.

In special subframes, since the number of DL symbols is limited, it may not be beneficial to have NPRS transmission, especially consider different cells need to have different NPRS frequency shift to avoid interference. Therefore, it is proposed that Proposal 17: Special Subframes are not Used for NPRS Transmission.

In NB-IoT FDD, the NRPS subframes are configured by using so called Part A and/or Part B. Part A uses a bit map to configure the NPRS subframes, and Part B specifies the number of consecutive NPRS subframes $N_{NPRS}$, the periodicity of the NPRS subframes $T_{NPRS}$, and an offset of the starting subframe indicated by $\alpha T_{NPRS}$. Here, $N_{NPRS} \in \{10, 20, 40, 80, 160, 320, 640, 1280\}$, $T_{NPRS} \in \{160, 320, 640, 1280\}$ ms, and $$\alpha \in \left\{0, \frac{1}{8}, \frac{2}{8}, \frac{3}{8}, \frac{4}{8}, \frac{5}{8}, \frac{6}{8}, \frac{7}{8}\right\}.$$

In principle, Part A can be directly applied in NB-IoT TDD. However, when it comes to Part B, some consideration needs to be taken. In NB-IoT FDD, the DL subframes are continuous, but in NB-IoT TDD, the DL subframes are interlaced with UL subframes. Therefore, if Part B is also adopted, the interpretation of the configurations provided by Part B need to be clarified. Due to the discontinuous nature of the NB-IoT TDD DL, this might result in the support of less $N_{NPRS}$, $T_{NPRS}$, and a combinations.

Due to the periodicity nature of Part B configurations, it would be preferred that the UL subframes are counted but not used when $N_{NPRS}$, $T_{NPRS}$, and α are used to configure the NPRS subframes. This is the same principle as the configuration of the NPDCCH search space. It makes both the eNB and UE easier to track the starting time of the NPRS transmission. However, this means the values of $N_{NPRS}$, and $T_{NPRS}$ may need to be extended, e.g., to accommodate the worst case such as TDD configuration #1 where only two DL subframes are available in each radio frame.

Proposal 18: Adopt Part a and Extend the Values of $N_{NPRS}$ and $T_{NPRS}$ in Part B for the NPRS Subframe Configurations in NB-IoT TDD.

Proposal 19: The UL Subframe are Counted but not Used when $N_{NPRS}$, $T_{NPRS}$ and α are Used to Configure the NPRS Subframes.

In Rel-14, NPRS muting is supported to reduce the interference for NPRS detection. Bit strings are used in Part A and Part B to indicate the muting patterns. For Part A, one bit in the string indicates if consecutive 10 subframes are muted or not, and for Part B, one bit in the string indicates if one NPRS occasion is muted or not. In NB-IoT TDD, NPRS muting should also be supported, but the interpretation of the bits in the string in Part A may need to be redefined as a consecutive of 10 DL NPRS subframes.

Proposal 20: NPRS Muting is Supported in NB-IoT TDD.

Proposal 21: NPRS Muting Pattern Indicated by Bit String in Part a should be Redefined as One Bit Indicated a Consecutive of 10 DL NPRS Subframes to be Muted Proposal 22: NPRS Muting Pattern Indicated by Bit String in Part B can be Reused in the NB-IoT FDD Design.

Other Issues

In NB-IoT FDD, a bit map for valid DL subframes is used to indicate to the UE which DL subframes are used for NPDCCH and NPDSCH. The valid DL subframes should also be supported for NB-IoT TDD, however, the interpretation of the bit map should be discussed. Two alternatives can be considered: 1) The bit map represents all the subframes, regardless whether it is UL or DL; 2) the bit map represents only the DL subframes. The advantage of alternative 1 is that we can have a unified the design for all TDD configurations (notice that the number of DL subframes are different for different configurations). Then advantage of alternative 2 is that the length of the bit map is shorter, which saves the resource when broadcast the bitmap in SIB1-NB. Since some of the NB-IoT TDD configurations have only limited DL resources, alternative 2 is preferred.

Proposal 23: Use a Bit Map Only Represents the DL Subframes to Indicate Valid Subframe Configurations.

In NB-IoT TDD, since in some configurations the number of DL subframes are very limited and due to different users are multiplexed in a TDM fashion, a user with long DL transmission can block other UEs. In the NB-IoT FDD system, the DL gap is introduced to solve this problem. Therefore, the DL gap should also be employed in the NB-IoT TDD system. However, similar to the DL bit map, the definition of the DL gap may need to be clarified. That is whether the length of the DL gap is based on the all the subframes, regardless whether it is UL or DL, or the DL gap only counts the DL subframes. If only the DL subframes are counted, the DL gap values in the NB-IoT system can be reused, otherwise, we may need to consider increasing the value of the DL gaps. To have a simplified design, it is proposed that:

Proposal 24: The DL Gap should Also be Employed by the NB-IoT TDD System, and the DL Gap Only Counts the DL Subframes.

Furthermore, new features, e.g., using NSSS for measurements, DL interference randomization enhancements by using new scrambling sequence, are proven to be beneficial for the NB-IoT FDD systems, and are introduced in Rel 14 and Rel 15. These features should also be included from the beginning of the NB-IoT TDD design.

Proposal 25: New Features that are Proven to be Beneficial for NB-IoT FDD Systems, e.g., NSSS for Measurements, DL Interference Randomization Enhancements by Using New Scrambling Sequence, should be Included from the Beginning of the NB-IoT TDD Design.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Description |
| --- | --- |
| DD | Frequency Division Duplex |
| LTE | Long Term Evolution |
| MIB | Master Information Block |
| NPSS | NB-IoT Primary Synchronization Signal |
| NSSS | NB-IoT Secondary Synchronization Signal |
| PRB | Physical Resource Block |
| RBG | Resource Block Group |
| SIB | System Information Block |
| TDD | Time Division Duplex |
| UE | User Equipment |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

The invention claimed is:

1. A network node configured to schedule a system information block type 1 for narrow band communication, (SIB1-NB) for a time division duplex (TDD) transmission, the network node comprising processing circuitry configured to:
   indicate the SIB1-NB scheduling information for TDD in a master information block (MIB) to a wireless device, wherein the SIB1-NB scheduling information indicates that the SIB1-NB transmission is on one of an anchor carrier and a non-anchor carrier and wherein the SIB1-NB scheduling information comprises a scheduling information parameter being associated with a predefined entry in a TDD-specific table for the anchor carrier when the SIB1-NB scheduling information indicates that the SIB1-NB transmission is on the anchor carrier, and in a TDD-specific table for the non-anchor carrier when the SIB1-NB scheduling information indicates that the SIB1-NB transmission is on the non-anchor carrier, wherein the TDD-specific table for the anchor carrier and the TDD-specific table for the non-anchor carrier are different tables, the predefined entry comprising:
   at least one subframe for the SIB1-NB transmission;
   a number of repetitions of the SIB1-NB transmission; and
   a transport block size (TBS) for the SIB1-NB transmission.

2. The network node of claim 1, wherein the at least one subframe for the SIB1-NB transmission is indicated by a subframe index of the at least one TDD-specific table.

3. The network node of claim 2, wherein the at least one subframe index equals at least one of: 0, 4 and 5.

4. The network node of claim 2, wherein the at least one subframe index indicates the corresponding TBS to use for the SIB1-NB transmission.

5. A method performed by a network node for scheduling a system information block type 1 for narrow band communication (SIB1-NB) for a time division duplex (TDD) transmission, the method comprising:
   indicating a SIB1-NB scheduling information for TDD in a master information block (MIB), wherein the SIB1-NB scheduling information indicates that the SIB1-NB transmission is on one of an anchor carrier and a non-anchor carrier and wherein the scheduling information comprises a parameter associated with a predefined entry in a TDD-specific table for the anchor carrier when the SIB1-NB scheduling information indicates that the SIB1-NB transmission is on the anchor carrier, and in a TDD-specific table for the non-anchor carrier when the SIB1-NB scheduling information indicates that the SIB1-NB transmission is on the non-anchor carrier, wherein the TDD-specific table for the anchor carrier and the TDD-specific table for the non-anchor carrier are different tables, the predefined entry comprising:
      at least one subframe for the SIB1-NB transmission;
      a number of repetitions of the SIB1-NB transmission; and
      a transport block size (TBS) for the SIB1-NB transmission.

6. The method of claim 5, wherein the at least one subframe for the SIB1-NB transmission is indicated by at least one subframe index of the at least one TDD-specific table.

7. The method of claim 6, wherein the at least one subframe index equals at least one of: subframe index: 0, 4 and 5.

8. The method of claim 6, wherein the at least one subframe index indicates the corresponding TBS to use for the SIB1-NB transmission.

9. A wireless device, configured to communicate with a network node to determine scheduling for a system information block type 1 for narrow band communication (SIB1-NB) for a time division duplex (TDD) transmission, the wireless device comprising processing circuitry configured to cause the wireless device to:
   receive SIB1-NB scheduling information in a master information block (MIB), wherein the SIB1-NB scheduling information indicates that the SIB1-NB transmission is on one of an anchor carrier and a non-anchor carrier and wherein the SIB1-NB scheduling information comprises a scheduling information parameter being associated with a predefined entry in a TDD-specific table for the anchor carrier when the SIB1-NB scheduling information indicates that the SIB1-NB transmission is on the anchor carrier, and in a TDD-specific table for the non-anchor carrier when the SIB1-NB scheduling information indicates that the SIB1-NB transmission is on the non-anchor carrier, wherein the TDD-specific table for the anchor carrier and the TDD-specific table for the non-anchor carrier are different tables; and
   determine, based on a value of the scheduling information parameter, an associated entry, wherein the associated entry is the predefined entry associated with the scheduling information parameter and located in the TDD-specific table for the anchor carrier when the SIB1-NB scheduling information indicates that the SIB1-NB transmission is on the anchor carrier, and is the predefined entry associated with the scheduling information parameter and located in the TDD-specific table for the non-anchor carrier when the SIB1-NB scheduling information indicates that the SIB1-NB transmission is on the non-anchor carrier, wherein the associated entry comprises:
      at least one subframe for a System Information Block Type 1-Narrow Band (SIB1-NB) transmission;
      a number of repetitions of the SIB1-NB transmission; and
      a transport block size (TBS) of the SIB1-NB transmission.

10. The wireless device of claim 9, wherein the at least one subframe for the SIB1-NB transmission is indicated by at least one subframe index of the at least one TDD-specific table.

11. The wireless device of claim 10, wherein the at least one subframe index equals at least one of subframe index: 0, 4 and 5.

12. The wireless device of claim 10, wherein the at least one subframe index indicates the corresponding TBS of the SIB1-NB transmission.

13. A method performed by a wireless device for determining scheduling for a system information block type 1 for narrow band communication (SIB1-NB) for a time division duplex (TDD) transmission, the method comprising:
   receiving SIB1-NB scheduling information in a master information block (MIB), wherein the SIB1-NB scheduling information indicates that the SIB1-NB transmission is on one of an anchor carrier and a non-anchor carrier and wherein the SIB1-NB scheduling information comprises a scheduling information parameter being associated with a predefined entry in a TDD-specific table for the anchor carrier when the SIB1-NB scheduling information indicates that the SIB1-NB transmission is on the anchor carrier, and in a TDD-specific table for the non-anchor carrier when the SIB1-NB scheduling information indicates that the SIB1-NB transmission is on the non-anchor carrier, wherein the TDD-specific table for the anchor carrier and the TDD-specific table for the non-anchor carrier are different tables; and
   determining, based on a value of the SIB1-NB scheduling parameter, an associated entry, wherein the associated entry is the predefined entry associated with the scheduling information parameter and located in the TDD-specific table for the anchor carrier when the SIB1-NB scheduling information indicates that the SIB1-NB transmission is on the anchor carrier, and is the predefined entry associated with the scheduling information parameter and located in the TDD-specific table for the non-anchor carrier when the SIB1-NB scheduling information indicates that the SIB1-NB transmission is on the non-anchor carrier, wherein the associated entry comprises:
      at least one subframe for a System Information Block Type 1-Narrow Band (SIB1-NB) transmission;
      a number of repetitions of the SIB1-NB transmission; and
      a transport block size (TBS) of the SIB1-NB transmission.

14. The method of claim 13, wherein the at least one subframe for the SIB1-NB transmission is indicated by a subframe index of the at least one TDD-specific table.

15. The method of claim 14, wherein the at least one subframe index equals at least one of subframe index: 0, 4 and 5.

16. The method of claim 14, wherein the at least one subframe index indicates the corresponding TBS of the SIB1-NB transmission.

17. A non-transitory computer readable storage medium having computer program code stored in the medium which when executed by a computer causes the computer to perform a method for scheduling a system information block type 1 for narrow band communication (SIB1-NB) for a time division duplex (TDD) transmission, the method comprising:

indicating a SIB1-NB scheduling information for TDD in a master information block (MIB), wherein the SIB1-NB scheduling information indicates that the SIB1-NB transmission is on one of an anchor carrier and a non-anchor carrier and wherein the scheduling information comprises a parameter associated with a predefined entry in a TDD-specific table for the anchor carrier when the SIB1-NB scheduling information indicates that the SIB1-NB transmission is on the anchor carrier, and in a TDD-specific table for the non-anchor carrier when the SIB1-NB scheduling information indicates that the SIB1-NB transmission is on the non-anchor carrier, wherein the TDD-specific table for the anchor carrier and the TDD-specific table for the non-anchor carrier are different tables, the predefined entry comprising:

at least one subframe for the SIB1-NB transmission;

a number of repetitions of the SIB1-NB transmission; and a transport block size (TBS) for the SIB1-NB transmission.

18. A non-transitory computer readable medium comprising a computer program comprising instructions which when executed on a computer cause the computer to perform a method for determining scheduling for a system information block type 1 for narrow band communication (SIB1-NB) for a time division duplex (TDD) transmission, the method comprising:

receiving SIB1-NB scheduling information in a master information block (MIB), wherein the SIB1-NB scheduling information indicates that the SIB1-NB transmission is on one of an anchor carrier and a non-anchor carrier and wherein the SIB1-NB scheduling information comprises a scheduling information parameter being associated with a predefined entry in a TDD-specific table for the anchor carrier when the SIB1-NB scheduling information indicates that the SIB1-NB transmission is on the anchor carrier, and in a TDD-specific table for the non-anchor carrier when the SIB1-NB scheduling information indicates that the SIB1-NB transmission is on the non-anchor carrier, wherein the TDD-specific table for the anchor carrier and the TDD-specific table for the non-anchor carrier are different tables; and determining, based on a value of the SIB1-NB scheduling parameter, an associated entry, wherein the associated entry is the predefined entry associated with the scheduling information parameter and located in the TDD-specific table for the anchor carrier when the SIB1-NB scheduling information indicates that the SIB1-NB transmission is on the anchor carrier, and is the predefined entry associated with the scheduling information parameter and located in the TDD-specific table for the non-anchor carrier when the SIB1-NB scheduling information indicates that the SIB1-NB transmission is on the non-anchor carrier, wherein the associated entry comprises:

at least one subframe for a System Information Block Type 1-Narrow Band (SIB1-NB) transmission;

a number of repetitions of the SIB1-NB transmission; and a transport block size (TBS) of the SIB1-NB transmission.

* * * * *